(12) United States Patent
Shampine

(10) Patent No.: US 11,157,025 B2
(45) Date of Patent: Oct. 26, 2021

(54) PRESSURE EXCHANGER MANIFOLD RESONANCE REDUCTION

(71) Applicant: Schlumberger Technology Corporation, Sugar Land, TX (US)

(72) Inventor: Rod William Shampine, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 104 days.

(21) Appl. No.: 16/346,812

(22) PCT Filed: Nov. 6, 2017

(86) PCT No.: PCT/US2017/060082
§ 371 (c)(1),
(2) Date: May 1, 2019

(87) PCT Pub. No.: WO2018/085742
PCT Pub. Date: May 11, 2018

(65) Prior Publication Data
US 2019/0278306 A1 Sep. 12, 2019

Related U.S. Application Data

(60) Provisional application No. 62/417,776, filed on Nov. 4, 2016.

(51) Int. Cl.
*G05D 16/02* (2006.01)
*E21B 33/13* (2006.01)
(Continued)

(52) U.S. Cl.
CPC ............ *G05D 16/02* (2013.01); *E21B 33/13* (2013.01); *E21B 43/26* (2013.01); *F04B 11/00* (2013.01);
(Continued)

(58) Field of Classification Search
None
See application file for complete search history.

(56) References Cited

U.S. PATENT DOCUMENTS 5,899,272 A   5/1999   Loree
5,935,490 A   8/1999   Archbold et al.
(Continued)

FOREIGN PATENT DOCUMENTS

WO   2010071994 A1   7/2010
WO   2014074939 A1   5/2014
WO   2016176531 A1   11/2016

*Primary Examiner* — Matthew Troutman
*Assistant Examiner* — Douglas S Wood
(74) *Attorney, Agent, or Firm* — Michael L. Flynn

(57) ABSTRACT

Apparatus and methods for reducing pressure exchanger manifold resonance. Example apparatus include a first manifold and pumps fluidly connected with the first manifold. Each pump is operable to inject a pressurized clean fluid into the first manifold. The apparatus may further include a second manifold and pressure exchangers each fluidly connected with the first and second manifolds. Each pressure exchanger is operable to receive the pressurized clean fluid from the first manifold and discharge the pressurized dirty fluid into the second manifold. The apparatus may also include a first flow restricting orifice fluidly connected along the first manifold, a second flow restricting orifice fluidly connected along the second manifold, and a discharge conduit fluidly connected with the wellbore to permit the pressurized dirty fluid to be injected into the wellbore during a well treatment operation.

27 Claims, 12 Drawing Sheets

(51) Int. Cl.
*E21B 43/26* (2006.01)
*F04B 11/00* (2006.01)
*F04B 15/02* (2006.01)
*F04B 23/06* (2006.01)
*F04B 13/00* (2006.01)
*G05D 16/04* (2006.01)
*F04F 13/00* (2009.01)

(52) U.S. Cl.
CPC .............. *F04B 15/02* (2013.01); *F04B 23/06* (2013.01); *F04F 13/00* (2013.01); *G05D 16/0404* (2019.01)

(56) References Cited

U.S. PATENT DOCUMENTS

| | | | |
|---|---|---|---|
| 10,683,708 B2* | 6/2020 | Hill | F16L 23/032 |
| 2002/0146325 A1 | 10/2002 | Shumway | |
| 2007/0023718 A1* | 2/2007 | Menconi | F16K 47/08 251/123 |
| 2008/0087253 A1* | 4/2008 | Cvengros | F02M 37/0041 123/457 |
| 2009/0180903 A1 | 7/2009 | Martin et al. | |
| 2009/0301725 A1 | 12/2009 | Case et al. | |
| 2010/0212156 A1 | 8/2010 | Judge et al. | |
| 2011/0085924 A1 | 4/2011 | Shampine et al. | |
| 2011/0154802 A1 | 6/2011 | Joshi et al. | |
| 2014/0048143 A1 | 2/2014 | Lehner et al. | |
| 2014/0076577 A1 | 3/2014 | Shampine | |
| 2014/0128655 A1 | 5/2014 | Arluck et al. | |
| 2015/0050167 A1 | 2/2015 | Hirosawa et al. | |
| 2016/0032702 A1* | 2/2016 | Gay | F04F 13/00 137/14 |
| 2016/0084269 A1 | 3/2016 | Hauge | |
| 2016/0146229 A1 | 5/2016 | Martin et al. | |
| 2016/0281487 A1 | 9/2016 | Ghasripoor et al. | |
| 2019/0278306 A1* | 9/2019 | Shampine | E21B 33/13 |
| 2020/0072025 A1* | 3/2020 | Shampine | F04B 23/06 |

\* cited by examiner

PRESSURE EXCHANGER MANIFOLD RESONANCE REDUCTION

CROSS-REFERENCE TO RELATED APPLICATIONS

This application claims the benefit of U.S. Provisional Patent Application No. 62/417,776, entitled "PRESSURE EXCHANGER MANIFOLD RESONANCE REDUCTION," filed Nov. 4, 2016, the entire disclosure of which is hereby incorporated herein by reference.

BACKGROUND OF THE DISCLOSURE

A variety of fluids are used in oil and gas operations. Fluids may be pumped into the subterranean formation through the use of one or more high-pressure pumps. Dirty fluids, such as solids-laden fluids containing insoluble abrasive solid particles, can reduce functional life and increase maintenance of the high-pressure pumps.

Pressure exchangers provide a way to exchange pressure energy between two fluid flows. An example pressure exchanger has a rotating rotor with multiple flow cavities, channels, or other chambers. The rotor rotates in a housing via a fluid-lubricated bearing. Disc valves at opposing ends of the pressure exchanger intermittently seal corresponding ends of the chambers between alternating passage of different ports of each disc valve. Fluid flow entering each chamber is directed along a small, off-axial vector, thus imparting rotation to the rotor.

As the rotor rotates, each chamber is in turn connected to a source of dirty fluid via a dirty fluid input port of one of the disc valves, such that the dirty fluid enters each chamber as the chamber passes the dirty fluid input port. As the rotor further rotates, each chamber is then connected to a source of high-pressure clean fluid via a clean fluid input port of one of the disc valves, such that the high-pressure clean fluid enters each chamber as the chamber passes the clean fluid input port, and an interface between the dirty fluid and the clean fluid is pushed away from the clean fluid input side, thus pressurizing and then ejecting the dirty fluid as further rotation causes the chamber to pass a dirty fluid discharge port of one of the disc valves. The now depressurized clean fluid may then be ejected as further rotation causes the chamber to pass a clean fluid discharge port of one of the disc valves. The cycle may be repeated continuously to form a continuous stream of pressurized dirty fluid.

In the application of rotary pressure exchangers in the field of hydraulic fracturing, cementing, drilling, and cuttings injection, the various piping networks and/or manifolds utilized during such operations comprise inherent or attendant resonant modes or frequencies. These modes are often excited by pressure oscillations (i.e., fluctuations, pulsations) due to both the pumping equipment used, such as plunger pumps, and the operation of the pressure exchangers. During operation, the pressure exchangers generate attendant medium frequency pressure oscillations caused by the disc valves (e.g., rotors, rotary valves), which operate at frequencies higher than those of many pumps, including the plunger pumps. Interaction of the pressure oscillations caused by the pumps, the pressure exchangers, and/or other equipment may produce unintended effects, such as improper equipment operation and fatigue failures.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a wellsite system operable to inject a pressurized dirty fluid into a wellbore during a well treatment operation. The wellsite system includes a first manifold, pumps, pressure exchangers, a first flow restricting orifice, a second flow restricting orifice, and a discharge conduit. The pumps each have a high-pressure outlet fluidly connected with the first manifold. Each pump is operable to inject a pressurized clean fluid into the first manifold. The pressure exchangers each have a high-pressure inlet fluidly connected with the first manifold, and a high-pressure outlet fluidly connected with the second manifold. Each pressure exchanger is operable to receive the pressurized clean fluid from the first manifold and discharge the pressurized dirty fluid into the second manifold. The first flow restricting orifice is fluidly connected along the first manifold. The second flow restricting orifice is fluidly connected along the second manifold. A discharge conduit is fluidly connected between the second manifold and the wellbore.

The present disclosure also introduces an apparatus including a wellsite system operable to inject a pressurized dirty fluid into a wellbore during a well treatment operation. The wellsite system includes a first manifold, pumps, second manifolds, third manifolds, pressure exchangers, and a discharge conduit. The pumps each have a high-pressure outlet fluidly connected with the first manifold. Each pump is operable to inject a pressurized clean fluid into the first manifold. The second manifolds are each fluidly connected with the first manifold. The pressure exchangers each have a high-pressure inlet fluidly connected with a corresponding one of the second manifolds, and a high-pressure outlet fluidly connected with a corresponding one of the third manifolds. Each pressure exchanger is operable to receive the pressurized clean fluid from the corresponding one of the second manifolds and discharge the pressurized dirty fluid into a corresponding one of the third manifolds. The fourth manifold is fluidly connected with each of the third manifolds. The discharge conduit is fluidly connected with the fourth manifold and the wellbore.

The present disclosure also introduces a method including operating each of multiple pumps to receive and pressurize a clean fluid. The pressurized clean fluid is directed from each of the pumps into a first manifold to distribute the pressurized clean fluid among multiple pressure exchangers. The pressurized clean fluid received into the first manifold is passed through a first flow restricting orifice fluidly connected along the first manifold to reduce pressure oscillations in the clean fluid within the first manifold. Each of the pressure exchangers is operated by receiving a dirty fluid and receiving the pressurized clean fluid to pressurize and discharge the dirty fluid. The pressurized dirty is directed from each of the pressure exchangers into a second manifold to combine the dirty fluid discharged by each of the pressure exchangers. The pressurized dirty fluid received into the second manifold is passed through a second flow restricting orifice fluidly connected along the second manifold to reduce pressure oscillations in the dirty fluid within the second manifold. The pressurized dirty fluid is directed out of the second manifold for injection into a wellbore during a well treatment operation.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
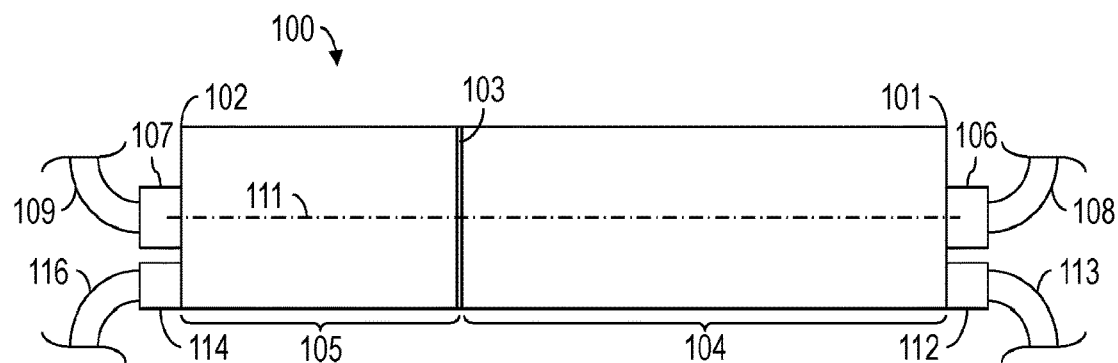
FIG. 1 is a schematic view of at least a portion of an example implementation of apparatus according to one or more aspects of the present disclosure.

It is to be understood that the following disclosure provides many different implementations, or examples, for implementing different features of various implementations. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various implementations described below. Moreover, the formation of a first feature over or on a second feature in the description that follows may include implementations in which the first and second features are formed in direct contact, and may also include implementations in which additional features may be formed interposing the first and second features, such that the first and second features may not be in direct contact. It should also be understood that the terms "first," "second," "third," etc., are arbitrarily assigned, are merely intended to differentiate between two or more parts, fluids, etc., and do not indicate a particular orientation or sequence.

The present disclosure introduces one or more aspects related to utilizing one or more pressure exchangers to divert a corrosive, abrasive, and/or solids-laden fluid (referred to herein as "dirty fluid") away from high-pressure pumps, instead of pumping such fluid with the high-pressure pumps. A non-corrosive, non-abrasive, and solids-free fluid (referred to herein as "clean fluid") may be pressurized by the high-pressure pumps, while the pressure exchangers, located downstream from the high-pressure pumps, transfer the pressure from the pressurized clean fluid to low-pressure dirty fluid. Such use of pressure exchangers may facilitate improved fluid control during well treatment operations and/or increased functional life of the high-pressure pumps and other wellsite equipment fluidly coupled between the high-pressure pumps and the pressure exchangers.

As used herein, a "fluid" is a substance that can flow and conform to the outline of its container when the substance is tested at a temperature of 71° F. (22° C.) and a pressure of one atmosphere (atm) (0.1 megapascals (MPa)). A fluid may be liquid, gas, or both. A fluid may be water based or oil based. A fluid may have just one phase or more than one distinct phase. A fluid may be a heterogeneous fluid having more than one distinct phase. Example heterogeneous fluids within the scope of the present disclosure include a solids-laden fluid or slurry (such as may comprise a continuous liquid phase and undissolved solid particles as a dispersed phase), an emulsion (such as may comprise a continuous liquid phase and at least one dispersed phase of immiscible liquid droplets), a foam (such as may comprise a continuous liquid phase and a dispersed gas phase), and a mist (such as may comprise a continuous gas phase and a dispersed liquid droplet phase), among other examples also within the scope of the present disclosure. A heterogeneous fluid may comprise more than one dispersed phase. Moreover, one or more of the phases of a heterogeneous fluid may be or comprise a mixture having multiple components, such as fluids containing dissolved materials and/or undissolved solids.

Plunger pumps may be employed in high-pressure oilfield pumping applications, such as for hydraulic fracturing ("frac") applications. Plunger pumps are often referred to as positive displacement pumps, intermittent duty pumps, triplex pumps, quintuplex pumps, or frac pumps, among other examples also within the scope of the present disclosure. Multiple plunger pumps may be employed simultaneously in large-scale operations, such as where tens of thousands of gallons of fluid are pumped into a wellbore. These pumps may be linked to each other with a manifold, such as may be plumbed to collect the output of the multiple pumps and direct it to the wellbore.

As described above, some fluids (e.g., fracturing fluid) may contain ingredients that are abrasive to the internal components of a pump. For example, a fracturing fluid generally contains proppant or other solid particulate material that is insoluble in a base fluid. To create fractures, the fracturing fluid may be pumped at high pressures ranging, for example, between about 5,000 and about 15,000 pounds force per square inch (psi) or more. The proppant may initiate the fractures and/or keep the fractures propped open. The propped fractures provide highly permeably flow paths for oil and gas to flow from the subterranean formation, thereby enhancing the production of a well formed in the formation. However, the abrasive fracturing fluid may accelerate wear of the internal components of the pumps. Consequently, the repair, replacement, and maintenance expenses of the pumps can be quite high, and life expectancy can be low.

Example implementations of apparatus described herein relate generally to a fluid system for forming and pressurizing a solids-laden fluid (e.g., fracturing fluid) having predetermined concentrations of solid material for injection into a wellbore during well treatment operations. The fluid system may include a blending or mixing device for receiving and mixing a solids-free carrying fluid or gel and a solid material to form the solids-laden fluid. The fluid system may also include a fluid pressure exchanger for increasing the pressure of or otherwise energizing the solids-laden fluid formed by the mixing device before being injected into the wellbore. The fluid pressure exchanger may be utilized to pressurize the solids-laden fluid by facilitating or permitting pressure from a pressurized solids-free fluid to be transferred to a low-pressure solids-laden fluid, among other uses. The fluid pressure exchanger may comprise one or more chambers into which the low-pressure, solids-laden fluid and the pressurized, solids-free fluid are conducted. The solids-free fluid may be conducted into the chamber at a higher pressure than the solids-laden fluid, and may thus be utilized to pressurize the solids-laden fluid. The pressurized, solids-laden fluid is then conducted from the chamber to a wellhead for injection into the wellbore. By pumping just the solids-free fluid with the pumps and utilizing the pressure exchanger to increase the pressure of the solids-laden fluid, the useful life of the pumps may be increased. Example implementations of methods described herein relate generally to utilizing the fluid system to form and pressure the solids-laden fluid for injection into the wellbore during well treatment operations.

FIG. 1 is a schematic view of an example implementation of a chamber 100 of a fluid pressure exchanger for pressurizing a dirty fluid with a clean fluid according to one or more aspects of the present disclosure. The chamber 100 includes a first end 101 and a second end 102. The chamber 100 may include a border or boundary 103 between the dirty and clean fluids defining a first volume 104 and a second volume 105 within the chamber 100. The boundary 103 may be a membrane that is impermeable or semi-permeable to a fluid, such as a gas. The membrane may be an impermeable membrane in implementations in which the dirty and clean fluids are incompatible fluids, or when mixing of the dirty and clean fluids is to be substantially prevented, such as to recycle the clean fluid absent contamination by the dirty fluid. The boundary 103 may be a semi-permeable membrane in implementations permitting some mixing of the clean fluid with the dirty fluid, such as to foam the dirty fluid when the clean fluid comprises a gas.

The boundary 103 may be a floating piston or separator slidably disposed along the chamber 100. The floating piston may physically isolate the dirty and clean fluids and be movable via pressure differential between the dirty and clean fluids. The floating piston may be retained within the chamber 100 by walls or other features of the chamber 100. The density of the floating piston may be set between that of the clean and dirty fluids, such as may cause gravity to locate the floating piston at an interface of the dirty and clean fluids when the chamber 100 is oriented vertically.

The boundary 103 may also be a diffusion or mixing zone in which the dirty and clean fluids mix or otherwise interact during pressurizing operations. The boundary 103 may also not exist, such that the first and second volumes 104 and 105 form a continuous volume within the chamber 100. A first inlet valve 106 is operable to conduct the dirty fluid into the first volume 104 of the chamber 100, and a second inlet valve 107 is operable to conduct the clean fluid into the second volume 105 of the chamber 100.

Figure 2:
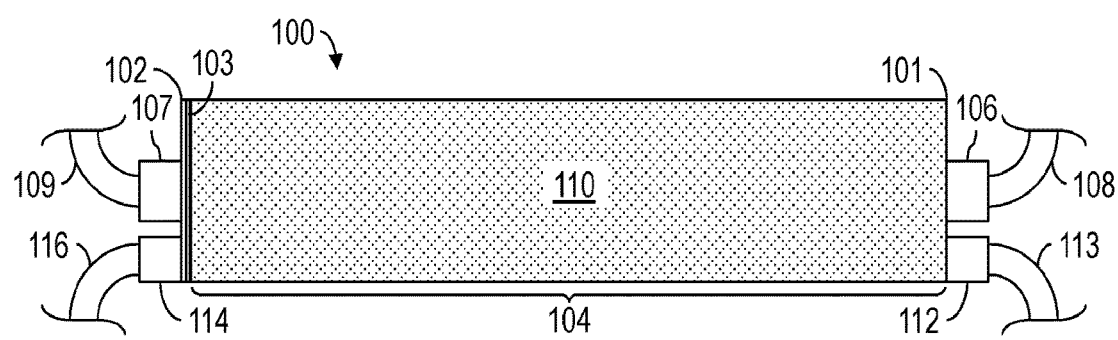
FIG. 2 is a schematic view of the apparatus shown in FIG. 1 in an operational stage according to one or more aspects of the present disclosure.

For example, FIG. 2 is a schematic view of the chamber 100 shown in FIG. 1 in an operational stage according to one or more aspects of the present disclosure, during which the dirty fluid 110 has been conducted into the chamber 100 through the first inlet valve 106 at the first end 101, such as via one or more fluid conduits 108. Consequently, the dirty fluid 110 may move the boundary 103 within the chamber 100 along a direction substantially parallel to the longitudinal axis 111 of the chamber 100, thereby increasing the first volume 104 and decreasing the second volume 105. The first inlet valve 106 may be closed after entry of the dirty fluid 110 into the chamber 100.

Figure 3:
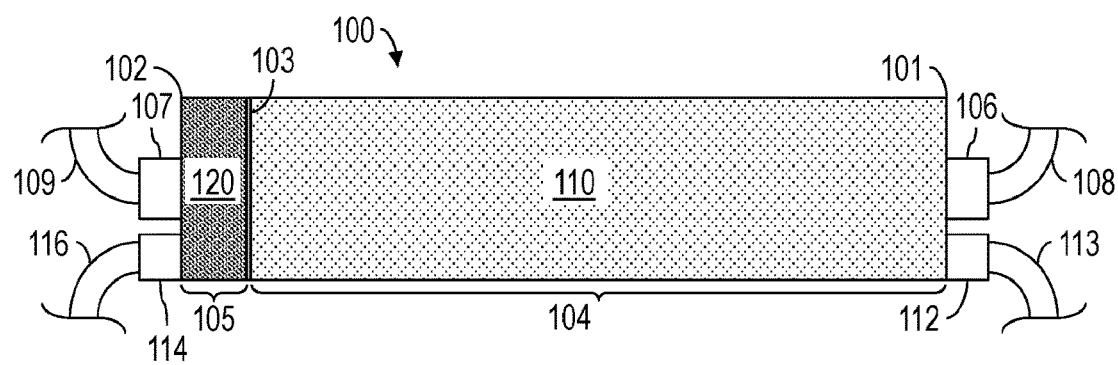
FIG. 3 is a schematic view of the apparatus shown in FIG. 2 in another operational stage according to one or more aspects of the present disclosure.

FIG. 3 is a schematic view of the chamber 100 shown in FIG. 2 in a subsequent operational stage according to one or more aspects of the present disclosure, during which a clean fluid 120 is being conducted into the chamber 100 through the second inlet valve 107 at the second end 102, such as via one or more fluid conduits 109. The clean fluid 120 may be conducted into the chamber 100 at a higher pressure compared to the pressure of the dirty fluid 110. Consequently, the higher-pressure clean fluid 120 may move the boundary 103 and the dirty fluid 110 within the chamber 100 back towards the first end 101, thereby reducing the volume of the first volume 104 and thereby pressurizing or otherwise energizing the dirty fluid 110. The clean fluid 120 may be a combustible or cryogenic gas that, upon combustion or heating, acts to pressurize the dirty fluid 110, whether instead of or in addition to the higher pressure of the clean fluid 120 acting to pressurize the dirty fluid 110. The boundary 103 and/or other components may include one or more burst discs to protect against overpressure from the clean fluid 120.

Figure 4:
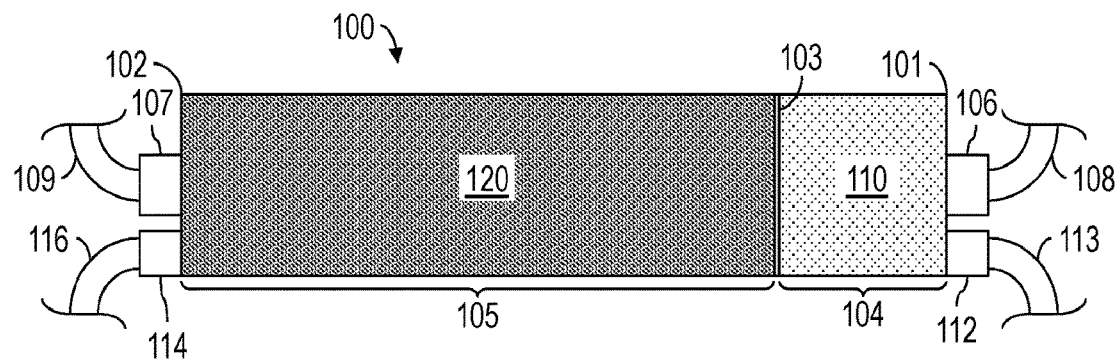
FIG. 4 is a schematic view of the apparatus shown in FIGS. 2 and 3 in another operational stage according to one or more aspects of the present disclosure.

As shown in FIG. 4, the boundary 103 may continue to reduce the first volume 104 as the pressurized dirty fluid 110 is conducted from the chamber 100 to a wellhead (not shown) at a higher pressure than when the dirty fluid 110 entered the chamber 100, such as via a first outlet valve 112 and one or more conduits 113. The second inlet valve 107 may then be closed, such as in response to pressure sensed by a pressure transducer within the chamber 100 and/or along one or more of the conduits and/or inlet valves.

After the pressurized dirty fluid 110 is discharged from the chamber 100, the clean fluid 120 may be drained via an outlet valve 114 at the second end 102 of the chamber 100 and one or more conduits 116. The discharged clean fluid 120 may be stored as waste fluid or reused during subsequent iterations of the fluid pressurizing process. For example, additional quantities of the dirty and clean fluids 110, 120 may then be introduced into the chamber 100 to repeat the pressurizing process to achieve a substantially continuous supply of pressurized dirty fluid 110.

Figure 5:
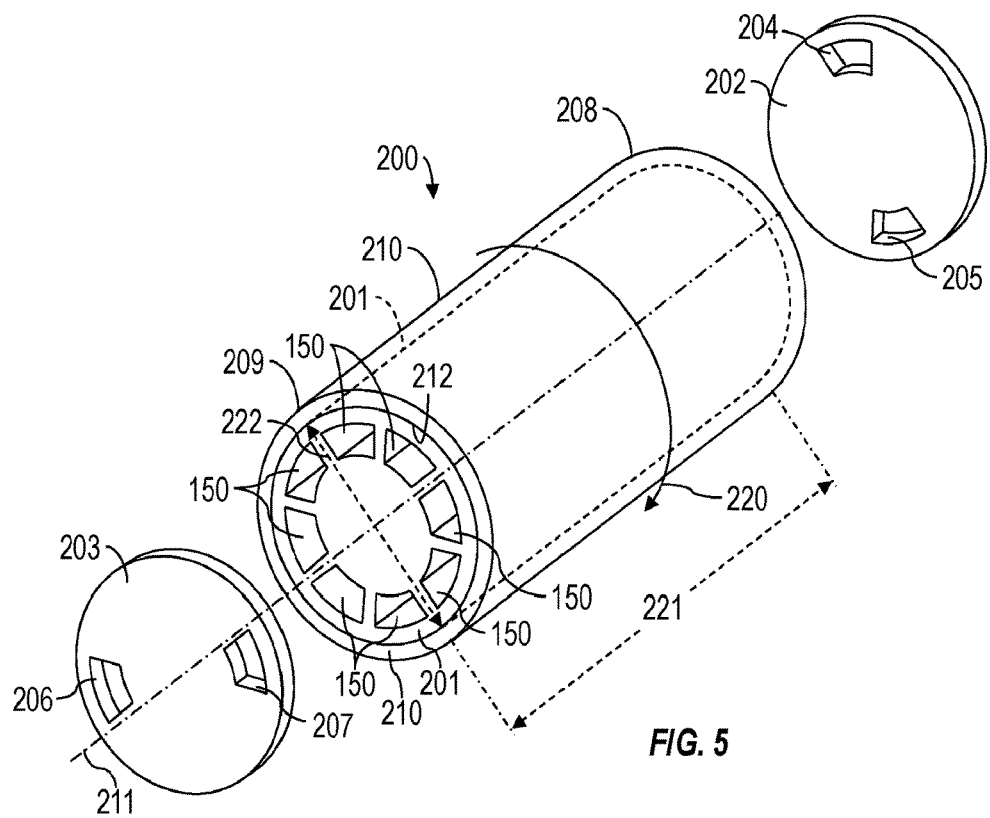
FIG. 5 is a partially exploded view of at least a portion of an example implementation of apparatus according to one or more aspects of the present disclosure.
Figure 6:
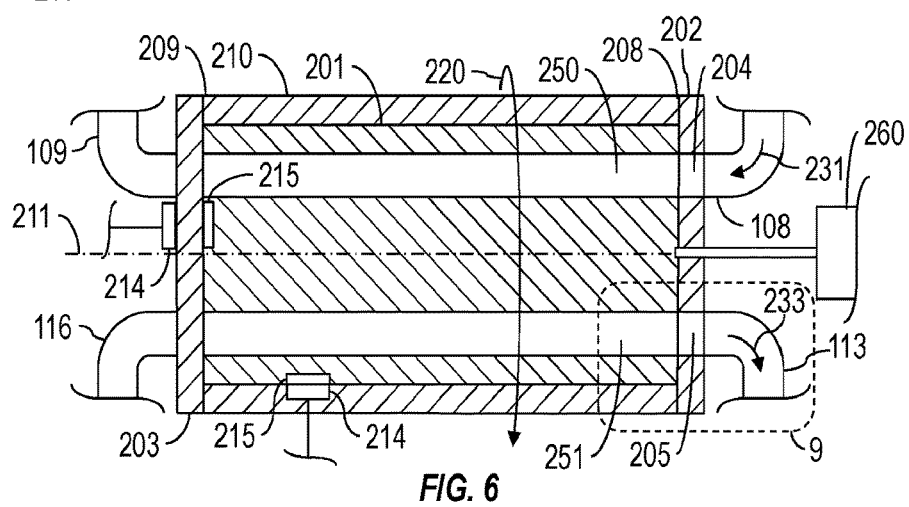
FIG. 6 is a sectional view of an example implementation of the apparatus shown in FIG. 5 according to one or more aspects of the present disclosure.
Figure 7:
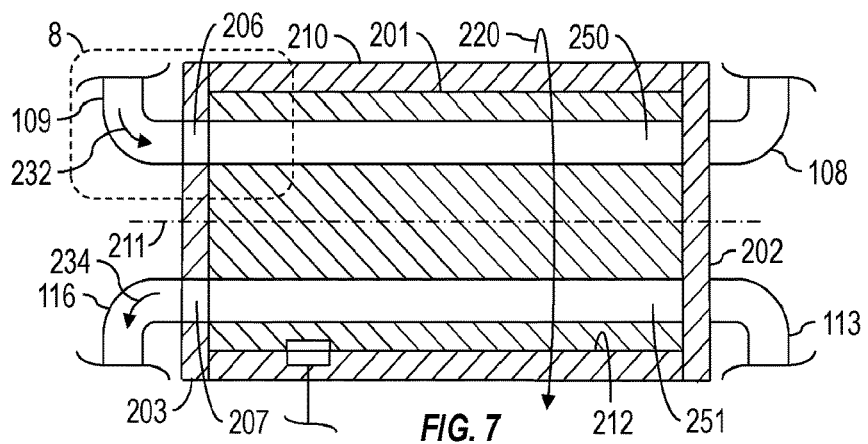
FIG. 7 is another view of the apparatus shown in FIG. 6 in a different stage of operation.

A fluid pressure exchanger comprising the apparatus shown in FIGS. 1-4 and/or others within the scope of the present disclosure may also comprise more than one of the example chambers 100 described above. FIG. 5 is a schematic view of an example fluid pressure exchanger 200 comprising multiple chambers 100 shown in FIGS. 1-4 and designated in FIG. 5 by reference numeral 150. FIGS. 6 and 7 are sectional views of the pressure exchanger 200 shown in FIG. 5. The following description refers to FIGS. 5-7, collectively.

The pressure exchanger 200 may comprise a housing 210 having a bore 212 extending between opposing ends 208, 209 of the housing 210. An end cap 202 may cover the bore 212 at the end 208 of the housing 210, and another end cap 203 may cover the bore 212 at the opposing end 209 of the housing 210. The housing 210 and the end caps 202, 203 may be sealingly engaged and statically disposed with respect to each other. The housing 210 and the end caps 202, 203 may be distinct components or members, or the housing 210 and one or both of the end caps 202, 203 may be formed as a single, integral, or continuous component or member. A rotor 201 may be slidably disposed within the bore 212 of the housing 210 and between the opposing end caps 202, 203 in a manner permitting relative rotation of the rotor 201 with respect to the housing 210 and end caps 202, 203. The rotor 201 may have a plurality of bores or chambers 150 extending through the rotor 201 and circumferentially spaced around an axis of rotation 211 extending longitudinally through the rotor 201. The rotor 201 may be a discrete member, as depicted in FIGS. 5-7, or an assembly of discrete components, such as may permit replacing worn portions of the rotor 201 and/or utilizing different materials for different portions of the rotor 201 to account for expected or actual wear.

The rotation of the rotor 201 about the axis 211 is depicted in FIG. 5 by arrow 220. Rotation of the rotor 201 may be achieved by various means. For example, rotation may be induced by utilizing force of the fluids received by the pressure exchanger 200, such as in implementations in which the fluids may be directed into the chambers 150 at a diagonal angle with respect to the axis of rotation 211, thereby imparting a rotational force to the rotor 201 to rotate the rotor 201. Rotation may also be achieved by a longitudinal geometry or configuring of at least a portion of the chambers 150 as they extend through the rotor 201. For example, an inlet portion of each chamber 150, or the entirety of each chamber 150, may extend in a helical manner with respect to the axis of rotation 211, such that the incoming stream of clean fluid imparts a rotational force to the rotor 201 to rotate the rotor 201.

Rotation may also be imparted via a motor 260 operably connected to the rotor 201. For example, the motor 260 may be an electrical or fluid powered motor connected with the rotor 201 via a shaft, a transmission, and/or other intermediate driving members, such as may extend through at least one of the end caps 202, 203 and/or the housing 210, to transfer torque to the rotor 201 to rotate the rotor 201. The motor 260 may also be connected with the rotor 201 via a magnetic shaft coupling, such as in implementations in which a driven magnet may be physically connected with the rotor 201, and a driving magnet may be located outside of the pressure exchanger 200 and magnetically connected with the driven magnet. Such implementations may permit the motor 260 to drive the rotor 201 without a shaft extending through the end caps 202, 203 and/or housing 210.

Rotation may also be imparted into the rotor 201 via an electrical motor (not shown) disposed about and connected with the rotor 201. For example, the electrical motor may comprise an electrical stator disposed about or included as part of the housing 210, and an electrical rotor connected about or included as part of the rotor 201. The electrical stator may comprise field coils or windings that generate a magnetic field when powered by electric current from a source of electric power. The electrical rotor may comprise windings or permanent magnets fixedly disposed about or included as part of the rotor 201. The electrical stator may surround the electrical rotor in a manner permitting rotation of the rotor 201/electrical rotor assembly within the housing 210/electrical stator assembly during operation of the electrical motor. The electrical motors utilized within the scope of the present disclosure may include, for example, synchronous and asynchronous electric motors.

The pressure exchanger 200 may also comprise means for sensing or otherwise determining the rotational speed of the rotor 201. For example, the rotor speed sensing means may comprise one or more sensors 214 associated the rotor 201 and operable to convert position or presence of a rotating or otherwise moving portion of the rotor 201, a feature of the rotor 201, or a marker 215 disposed in association with the rotor 201, into an electrical signal or information related to or indicative of the position and/or speed of the rotor 201. Each sensor 214 may be disposed adjacent the rotor 201 or otherwise disposed in association with the rotor 201 in a manner permitting sensing of the rotor or the marker 215 during pressurizing operations.

Each sensor 214 may sense one or more magnets on the rotor 201, one or more features on the rotor 201 that can be optically detected, conductive portions or members on the rotor 201 that can be sensed with an electromagnetic sensor, and/or facets or features on the rotor 201 that can be detected with an ultrasonic sensor, among other examples. Each sensor 214 may be or comprise a linear encoder, a capacitive sensor, an inductive sensor, a magnetic sensor, a Hall effect sensor, and/or a reed switch, among other examples. The speed sensing means may also include an intentionally imbalanced rotor 201 whose vibrations may be detected with an accelerometer and utilized to determine the rotational speed of the rotor 201.

The sensors 214 may extend through the housing 210, the end caps 202, 203, or another pressure barrier fluidly isolating the internal portion of the pressure exchanger 201 in a manner permitting the detection of the presence of the rotor 201 or the marker 215 at a selected or predetermined position. The sensor 214 and/or an electrical conductor connected with the sensor 214 may be sealed against the pressure barrier, such as to prevent or minimize fluid leakage. However, a non-magnetic housing 210 and/or end caps 202, 203 may be utilized, such as may permit a magnetic field to pass therethrough and, thus, permit the sensors 214 to be disposed on the outside of the housing 210 and/or end caps 202, 203. The sensor 214 may also be an ultrasonic transducer operable to send a pressure wave through the housing 210 and into the rotor 201, such as in implementations in which the housing 210 is a steel housing and the rotor 201 is a ceramic stator. The pressure wave may be reflected from varying markers or portions of the rotor 201 and sensed by the ultrasonic transducer to determine the rotational speed of the rotor 201.

The end caps 202, 203 may functionally replace the valves 106, 107, 112, and 114 depicted in FIGS. 1-4. For example, the first end cap 202 may be substantially disc-shaped, or may comprise a substantially disc-shaped portion, through which an inlet 204 and an outlet 205 extend. The inlet 204 may act as the first inlet valve 106 shown in FIGS. 1-4, and the outlet 205 may act as the first outlet valve 112 shown in FIGS. 1-4. Similarly, the second end cap 203 may be substantially disc-shaped, or may comprise a substantially disc-shaped portion, through which an inlet 206 and an outlet 207 extend. The inlet 206 may act as the second inlet valve 107 shown in FIGS. 1-4, and the outlet 207 may act as the second outlet valve 114 shown in FIGS. 1-4. The fluid inlets and outlets 204-207 may have a variety of dimensions and shapes. For example, as in the example implementation depicted in FIG. 5, the inlets and outlets 204-207 may have dimensions and shapes substantially corresponding to the cross-sectional dimensions and shapes of the openings of each chamber 150 at the opposing ends of the rotor 201. However, other implementations are also within the scope of the present disclosure, provided that the chambers 150 may each be sealed against the end caps 202, 203 in a manner preventing or minimizing fluid leaks. For example, the surfaces of the end caps 202, 203 that mate with the corresponding ends of the rotor 201 may comprise face seals and/or other sealing means.

In the example implementation depicted in FIG. 5, the rotor 201 comprises eight chambers 150. However, other implementations within the scope of the present disclosure may comprise as few as two chambers 150, or as many as several dozen. The rotational speed of the rotor 201 may also vary, and may be timed as per the velocity of the boundary 103 between the dirty and clean fluids and the length 221 of the chambers 150 so that the timing of the inlets and outlets 204-207 are adjusted in order to facilitate proper functioning as described herein. The rotational speed of the rotor 201 may be based on the intended flow rate of the pressurized dirty fluid exiting the chambers 150 collectively, the amount of pressure differential between the dirty and clean fluids, and/or the dimensions of the chambers 150. For example, larger dimensions of the chambers 150 and greater rotational speed of the rotor 201 relative to the end caps 202, 203 and housing 210 will increase the discharge volume of the pressurized dirty fluid.

The size and number of instances of the fluid pressure exchanger 200 utilized at a wellsite in oil and gas operations may depend on the location of the fluid pressure exchanger 200 within the process flow stream at the wellsite. For example, some oil and gas operations at a wellsite may utilize multiple pumps (such as the pumps 306 shown in FIG. 11) that each receive low-pressure dirty fluid from a common manifold (such as the manifold 308 shown in FIG. 11) and then pressurize the dirty fluid for return to the manifold. For such operations, an instance of the fluid pressure exchanger 200 may be utilized between each pump and the manifold, and/or one or more instances of the fluid pressure exchanger 200 may replace one or more of the pumps. In such implementations, the rotor 201 may have a length 221 ranging between about 25 centimeters (cm) and about 150 cm and a diameter 222 ranging between about 10 cm and about 30 cm, the cross-sectional area (flow area) of each chamber 150 may range between about 5 $cm^2$ and about 20 $cm^2$, and/or the volume of each chamber 150 may range between about 75 cubic cm (cc) and about 2500 cc. However, other dimensions are also within the scope of the present disclosure. Some oil and gas operations at a wellsite may utilize multiple pumps that each receive low-pressure dirty fluid directly from a corresponding mixer (such as the mixer 304 shown in FIG. 11) or another source of dirty fluid, and then pressurize the dirty fluid for injection directly into a well (such as the well 311 shown in FIG. 11). For such operations, an instance of the fluid pressure exchanger 200 may be utilized between each pump and the well, and/or one or more instances of the fluid pressure exchanger 200 may replace one or more of the pumps.

In some implementations, the pumps may each receive low-pressure clean fluid from the manifold (such as may be received at the manifold from a secondary fluid source) and then pressurize the clean fluid for return to the manifold. The pressurized clean fluid may then be conducted from the manifold to one or more instances of the fluid pressure exchanger 200 to be utilized to pressurize low-pressure dirty fluid received from a gel maker, proppant blender, and/or other low-pressure processing device, and the pressurized dirty fluid discharged from the fluid pressure exchanger(s) 200 may be conducted towards a well. Examples of such operations include those shown in FIGS. 12-18, among other examples within the scope of the present disclosure. In such implementations, the length 221 of the rotor 201, the diameter 222 of the rotor 201, the flow area of each chamber 150, the volume of each chamber 150, and/or the number of chambers 150 may be much larger than as described above.

FIG. 6 is a sectional view of the pressure exchanger 200 shown in FIG. 5 during an operational stage in which two of the chambers are substantially aligned with the inlet and outlet 204, 205 of the first end cap 202 but not with the inlet and outlet 206, 207 of the second end cap 203. Thus, the inlet 204 fluidly connects one of the depicted chambers 150, designated by reference number 250 in FIG. 6, with the one or more conduits 108 supplying the non-pressurized dirty fluid, such that the non-pressurized dirty fluid may be conducted into the chamber 250. At the same time, the outlet 205 fluidly connects another of the depicted chambers 150, designated by reference number 251 in FIG. 6, with the one or more conduits 113 conducting previously pressurized dirty fluid out of the chamber 251, such as for conduction into a wellbore (not shown). As the rotor 201 rotates relative to the end caps 202, 203, the chambers 250, 251 will rotate out of alignment with the inlet and outlet 204, 205, thus preventing fluid communication between the chambers 250, 251 and the respective conduits 108, 113.

FIG. 7 is another view of the apparatus shown in FIG. 6 during another operational stage in which the chambers 250, 251 are substantially aligned with the inlet and outlet 206, 207 of the second end cap 203 but not with the inlet and outlet 204, 205 of the first end cap 202. Thus, the inlet 206 fluidly connects the chamber 250 with the one or more conduits 109 supplying the pressurizing or energizing clean fluid, such that the clean fluid may be conducted into the chamber 250. At the same time, the outlet 207 fluidly connects the other chamber 251 with the one or more conduits 116 conducting previously used, pressurizing, clean fluid out of the chamber 251, such as for recirculation to the clean fluid source (not shown). As the rotor 201 further rotates relative to the end caps 202, 203 and the housing 210, the chambers 250, 251 will rotate out of alignment with the inlet and outlet 206, 207, thus preventing fluid communication between the chambers 250, 251 and the respective conduits 109, 116.

The pressurizing process described above with respect to FIGS. 1-4 is achieved within each chamber 150, 250, 251 with each full rotation of the rotor 201 relative to the end caps 202, 203. For example, as the rotor 201 rotates relative to the end caps 202, 203 and the housing 210, the non-pressurized dirty fluid is conducted into the chamber 250 during the portion of the rotation in which the chamber 250 is in fluid communication with inlet 204 of the first end cap 202, as indicated in FIG. 6 by arrow 231. The rotation is continuous, such that the flow rate of non-pressurized dirty fluid into the chamber 250 increases as the chamber 250 comes into alignment with the inlet 204, and then decreases as the chamber 250 rotates out of alignment with the inlet 204. Further rotation of the rotor 201 relative to the end caps 202, 203 permits the pressurizing clean fluid to be conducted into the chamber 250 during the portion of the rotation in which the chamber 250 is in fluid communication with the inlet 206 of the second end cap 203, as indicated in FIG. 7 by arrow 232. The influx of the pressurizing clean fluid into the chamber 250 pressurizes the dirty fluid, such as due to the pressure differential between the dirty and clean fluids described above with respect to FIGS. 1-4.

Further rotation of the rotor 201 relative to the end caps 202, 203 and the housing 210 permits the pressurized dirty fluid to be conducted out of the chamber 250 during the portion of the rotation in which the chamber 250 is in fluid communication with the outlet 205 of the first end cap 202, as indicated in FIG. 6 by arrow 233. The discharged fluid may substantially comprise just the (pressurized) dirty fluid or a mixture of the dirty and clean fluids (also pressurized), depending on the timing of the rotor 201 and perhaps whether the chambers include the boundary 103 shown in FIGS. 1-4. Further rotation of the rotor 201 relative to the end caps 202, 203 permits the reduced-pressure clean fluid to be conducted out of the chamber 250 during the portion of the rotation in which the chamber 250 is in fluid communication with the outlet 207 of the second end cap 203, as indicated in FIG. 7 by arrow 234. The pressurizing process then repeats as the rotor 201 further rotates and the chamber 250 again comes into alignment with the inlet 204 of the first end cap 202.

Depending on the number and size of the chambers 150, the non-pressurized dirty fluid inlet 204 and the pressurizing clean fluid inlet 206 may be wholly or partially misaligned with each other about the central axis 211, such that the dirty fluid may be conducted into the chamber 150 to entirely or mostly fill the chamber 150 before the clean fluid is conducted into that chamber 150. The non-pressurized dirty fluid inlet 204 is completely closed to fluid flow from the conduit 108 before the pressurizing clean fluid inlet 206 begins opening. The pressurized dirty fluid outlet 205 and the reduced-pressure clean fluid outlet 207, however, may be partially open when the pressurizing clean fluid inlet 206 is permitting the clean fluid into the chamber 150. Similarly, the non-pressurized dirty fluid inlet 204 may be partially open when the pressurized dirty fluid outlet 205 and/or the reduced-pressure clean fluid outlet 207 is at least partially open.

The pressurized dirty fluid outlet 205 and the reduced-pressure clean fluid outlet 207 may be wholly or partially misaligned with each other about the central axis 211. For example, the pressurized dirty fluid (and perhaps a pressurized mixture of the dirty and clean fluids) may be substantially discharged from a chamber 150 via the pressurized dirty fluid outlet 205 before the remaining reduced-pressure clean fluid is permitted to exit through the reduced-pressure clean fluid outlet 207. As the rotor 201 continues to rotate relative to the end caps 202, 203 and the housing 210, the pressurized dirty fluid outlet 205 becomes closed to fluid flow, and the reduced-pressure clean fluid outlet 207 becomes open to discharge the remaining reduced-pressure clean fluid. Thus, the reduced-pressure clean fluid outlet 207 may be completely closed to fluid flow while the pressurized dirty fluid (or mixture of the dirty and clean fluids) is discharged from the chamber 150 to the wellhead. Complete closure of the reduced-pressure clean fluid outlet 207 may permit the pressurized fluid to maintain a higher-pressure flow to the wellhead.

The inlets and outlets 204-207 may also be configured to permit fluid flow into and out of more than one chamber 150 at a time. For example, the non-pressurized dirty fluid inlet 204 may be sized to simultaneously fill more than one chamber 150, the inlet and outlets 204-207 may be configured to permit non-pressurized dirty fluid to be conducted into a chamber 150 while the reduced-pressure clean fluid is simultaneously being discharged from that chamber 150. Depending on the size of the rotor 201 and the chambers 150, the fluid properties of the dirty and clean fluids, and the rotational speed of the rotor 201 relative to the end caps 202, 203, the pressurizing process within each chamber 150 may also be achieved in less than one rotation of the rotor 201 relative to the end caps 202, 203 and the housing 210, such as in implementations in which two, three, or more iterations of the pressurizing process is achieved within each chamber 150 during a single rotation of the rotor 201.

The flow of dirty fluid out of the pressure exchanger 200 via the fluid conduit 116 may be prevented or otherwise minimized by controlling the timing of the opening and closing of the fluid inlets 204, 206 and outlets 205, 207 of the pressure exchanger 200. For example, during the pressurizing operations, as the chambers 150 rotate, each chamber 150 is in turn aligned and, thus, fluidly connected with the low-pressure inlet 204 to receive the dirty fluid and the low-pressure outlet 207 to discharge the clean fluid. As the dirty fluid fills the chamber 150, the boundary 103 moves toward the low-pressure outlet 207 as the clean fluid is pushed out of the chamber 150. However, the rotation of the rotor 201 seals off the outlet 207 of the chamber 150 when or just before the boundary 103 reaches the outlet 207 to prevent or minimize the dirty fluid from entering into the fluid conduit 116. The chamber 150 then becomes aligned with the high-pressure inlet 206 and the high-pressure outlet 205 to permit the high-pressure clean fluid to enter the chamber 150 via the inlet 206 to push the dirty fluid from the chamber 150 via the outlet 205 at an increased pressure. As the clean fluid fills the chamber 150, the boundary 103 moves toward the high-pressure outlet 205 as the dirty fluid is pushed out of the chamber 150. However, the rotation of the rotor 201 seals off the outlet 205 of the chamber 150 when or just before the boundary 103 reaches the outlet 205 to prevent or minimize the clean fluid from entering into the fluid conduit 113. The clean fluid left in the chamber 150 may be pushed out through the fluid conduit 116 by the dirty fluid when the chamber 150 again becomes aligned with the low-pressure inlet 204 to receive the dirty fluid and the low-pressure outlet 207 to discharge the clean fluid. Such cycle may be continuously repeated to continuously receive and pressurize the stream of dirty fluid to form a substantially continuous or uninterrupted stream of dirty fluid.

Figure 8:
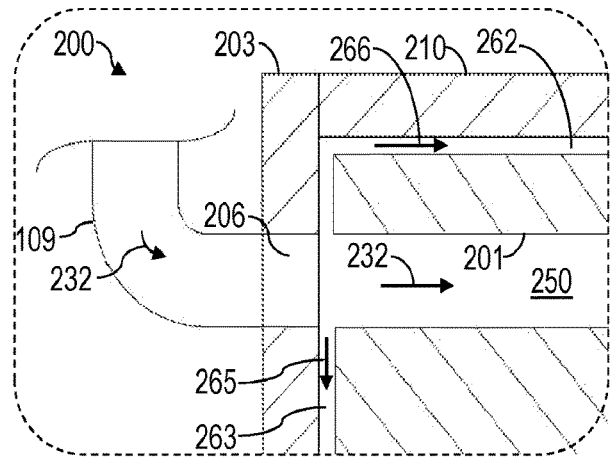
FIG. 8 is an enlarged view of the apparatus shown in FIG. 7 according to one or more aspects of the present disclosure.
Figure 9:
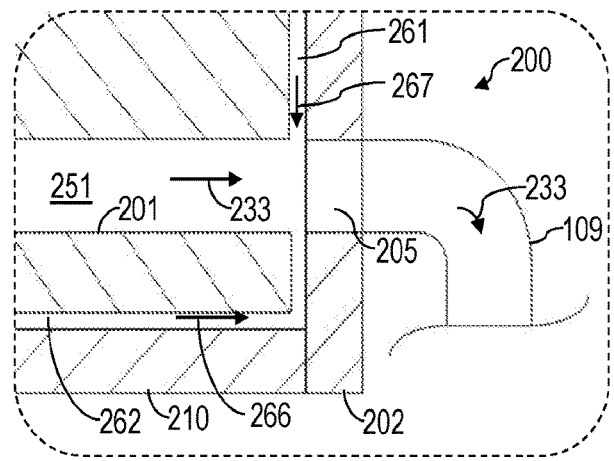
FIG. 9 is an enlarged view of the apparatus shown in FIG. 6 according to one or more aspects of the present disclosure.

FIGS. 8 and 9 are enlarged views of portions of the pressure exchanger 200 shown in FIGS. 7 and 6, respectively, according to one or more aspects of the present disclosure. The following description refers to FIGS. 6-9, collectively.

Small gaps or spaces 261, 262, 263 may be maintained between the rotor 201 and the housing 210, and between the rotor 201 and the end caps 202, 203, to permit rotation of the rotor 201 within the housing 210 and the end caps 202, 203. For clarity, the housing 210 and the end caps 202, 203 may be collectively referred to hereinafter as a "housing assembly." The spaces 261, 262, 263 may permit fluid flow between the rotor 201 and the housing assembly. For example, dirty fluid within the pressure exchanger 200 may flow through the space 261 along the end cap 202 from the high-pressure outlet 205 to the low-pressure fluid inlet 204, and through the spaces 261, 262, 263 along the housing 210 and the end caps 202, 203 from the high-pressure outlet 205 to the clean fluid low-pressure outlet 207. Clean fluid within the pressure exchanger 200 may flow through the space 263 along the end cap 203 from the high-pressure inlet 206 to the low-pressure outlet 207, as indicated by arrow 265, and through the spaces 261, 262, 263 along the housing 210 and the end caps 202, 203 from the high-pressure inlet 206 to the dirty fluid inlet and outlet 204, 205, as indicated by arrows 265, 266, 267.

The fluid flow through the spaces 261, 262, 263 within the pressure exchanger 200 may form a fluid film or layer operating as a hydraulic bearing and/or otherwise providing lubrication between the rotating rotor 201 and the static housing assembly, such as may prevent or reduce contact or friction between the rotor 201 and the housing assembly during pressurizing operations. The flow of fluids through the spaces 261, 262, 263 may be biased such that substantially just the clean fluid, and not the dirty fluid, flows through the spaces 261, 262, 263 during pressurizing operations, as indicated by arrows 265, 266, 267. Biasing the flow of clean fluid through the spaces 261, 262, 263 may also cause the clean/dirty fluid boundary 103 (shown in FIGS. 1-4) to maintain a net velocity directed toward the dirty fluid outlet 205. Accordingly, biasing the flow of clean fluid may result in substantially just the clean fluid being communicated through the spaces 261, 262, 263, such as to prevent or minimize friction or wear caused by the dirty fluid between the rotor 201 and the housing assembly. Biasing the flow of the clean fluid may also result in substantially just the clean fluid being discharged via the clean fluid outlet 207, such as to prevent or minimize contamination of the clean fluid discharged from the pressure exchanger 200. The apparatus and method implemented to bias the flow of clean fluid through the spaces 261, 262, 263 is further described below.

Figure 10:
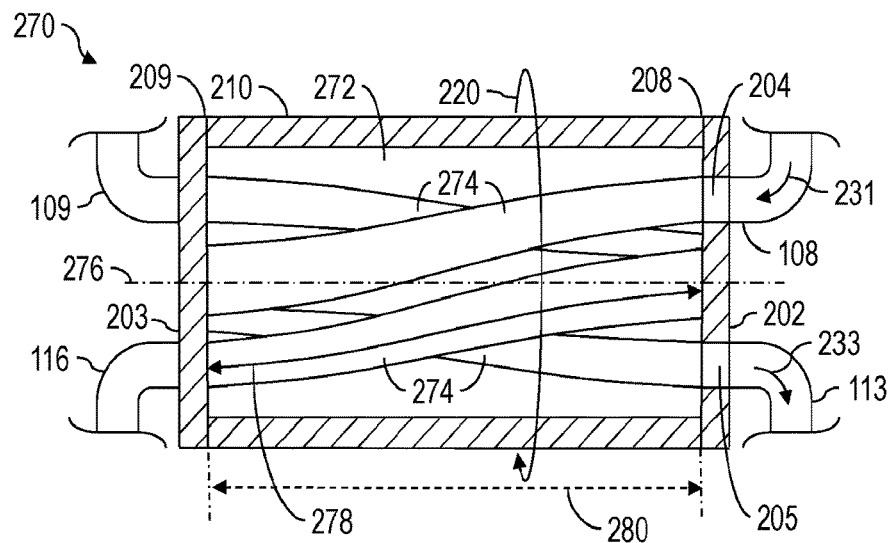
FIG. 10 is a sectional view of another example implementation of the apparatus shown in FIG. 5 according to one or more aspects of the present disclosure.

FIG. 10 is a sectional view of another example implementation of the pressure exchanger 200 shown in FIG. 5 according to one or more aspects of the present disclosure and designated in FIG. 10 by reference numeral 270. The pressure exchanger 270 is substantially similar in structure and operation to the pressure exchanger 200, including where indicated by like reference numbers, except as described below.

The pressure exchanger 270 may include a rotor 272 slidably disposed within the bore of the housing 210 and between the opposing end caps 202, 203 in a manner permitting relative rotation of the rotor 272 with respect to the housing 210 and the end caps 202, 203. The rotor 272 may have multiple bores or chambers 274 extending through the rotor 272 between the opposing ends 208, 209 of the housing 210 and circumferentially spaced around an axis of rotation 276 extending longitudinally along the rotor 272. For the sake of clarity, cross-hatching of the rotor 272 is removed from FIG. 10, and just four chambers 274 are depicted, it being understood that other chambers 274 may also exist.

The chambers 274 extend through the rotor 272 in a helical manner about or otherwise with respect to the axis of rotation 276. As described above, such helical chamber implementations may be utilized to impart rotation to the rotor 272 instead of with a separate motor 260 or other rotary driving means. Such helical chamber implementations may also permit the length 278 of the chambers 274 to be greater than the axial length 280 of the rotor 272, which may permit the axial length 280 of the rotor 272 to be reduced. The increased length 278 of the chambers 274 may also permit the rotor 272 to be rotated at slower speeds than a rotor having chambers that extend substantially parallel with respect to the axis of rotation.

The pressure exchangers 200, 270 shown in FIGS. 5-10 and/or otherwise within the scope of the present disclosure may utilize various forms of the dirty and clean fluids described above. For example, the dirty fluid may be a high-density and/or high-viscosity, solids-laden fluid comprising insoluble solid particulate material and/or other ingredients that may compromise the life or maintenance of pumps disposed downstream of the fluid pressure exchangers 200, 270, especially when such pumps are operated at higher pressures. Examples of the dirty fluid utilized in oil and gas operations may include treatment fluid, drilling fluid, spacer fluid, workover fluid, a cement composition, fracturing fluid, acidizing fluid, stimulation fluid, and/or combinations thereof, among other examples also within the scope of the present disclosure. The dirty fluid may be a foam, a slurry, an emulsion, or a compressible gas. The viscosity of the dirty fluid may be sufficient to permit transport of solid additives or other solid particulate material (collectively referred to hereinafter as "solids") without appreciable settling or segregation. Chemicals, such as biopolymers (e.g. polysaccharides), synthetic polymers (e.g. polyacrylamide and its derivatives), crosslinkers, viscoelastic surfactants, oil gelling agents, low molecular weight organogelators, and phosphate esters, may also be included in the dirty fluid, such as to control viscosity of the dirty fluid.

The composition of the clean fluid may permit the clean fluid to be pumped at higher pressures with reduced adverse effects on the downstream and/or other pumps. For example, the clean fluid may be a solids-free fluid that does not include insoluble solid particulate material or other abrasive ingredients, or a fluid that includes low concentrations of insoluble solid particulate material or other abrasive ingredients. The clean fluid may be a liquid, such as water (including freshwater, brackish water, or brine), a gas (including a cryogenic gas), or combinations thereof. The clean fluid may also include substances, such as tracers, that can be transferred to the dirty fluid upon mixing within the chambers 150, 250, 274, or upon transmission through a semi-permeable implementation of the boundary 103. The viscosity of the clean fluid may also be increased, such as to minimize or reduce viscosity contrast between the dirty and clean fluids. Viscosity contrast may result in channeling of the lower viscosity fluid through the higher viscosity fluid.

The clean fluid may be viscosified utilizing the same chemicals and/or techniques described above with respect to the dirty fluid.

The clean and/or dirty fluid may be chemically modified, such as via one or more fluid additives temporarily (or regularly) injected into the clean and/or dirty fluids to produce a reaction at the clean/dirty boundary 103 that acts to stabilize the boundary 103 (e.g., a membrane, mixing zone). For example, viscosity modification may be utilized to help form a substantially flat flow profile within the chambers 150, 250, 274. Also, one or repeated pulses of a crosslinker applied to the clean fluid may be utilized to form crosslinked gel pills in the chambers 150, 250, 274 to act as boundary stabilizers. Such stabilizers may be safely pumped into the well and replaced over time.

Furthermore, the clean and dirty fluids may be selected or formulated such that a reaction between the clean and dirty fluids creates a physical change at the clean/dirty boundary 103 that stabilizes the boundary 103. For example, the clean and dirty fluids may crosslink when interacting at the boundary 103 to produce a floating, viscous plug. The clean and dirty fluids may be formulated such that the plug or another product of such reaction may not damage downstream components when trimmed off and injected into the well by the action of the outlet 205 or another discharge valve.

The following are additional examples of the dirty and clean fluids that may be utilized during oil and gas operations. However, the following are merely examples, and are not considered to be limiting to the dirty and clean fluids and that may also be utilized within the scope of the present disclosure.

For fracturing operations, the dirty fluid may be a slurry, with a continuous phase comprising water, and a dispersed phase comprising proppant (including foamed slurries), including implementations in which the dispersed proppant includes two or more different size ranges and/or shapes, such as may optimize the amount of packing volume within the fractures. The dirty fluid may also be a cement composition (including foamed cements), or a compressible gas. For such fracturing implementations, the clean fluid may be a liquid comprising water, a foam comprising water and gas, a gas, a mist, or a cryogenic gas.

For cementing operations, including squeeze cementing, the dirty fluid may be a cement composition comprising water as a continuous phase and cement as a dispersed phase, or a foamed cement composition. For such cementing implementations, the clean fluid may be a liquid comprising water, a foam comprising water and gas, a gas, a mist, or a cryogenic gas.

For drilling, workover, acidizing, and other wellbore operations, the dirty fluid may be a homogenous solution comprising water, soluble salts, and other soluble additives, a slurry with a continuous phase comprising water and a dispersed phase comprising additives that are insoluble in the continuous phase, an emulsion or invert emulsion comprising water and a hydrocarbon liquid, or a foam of one or more of these examples. In such implementations, the clean fluid may be a liquid comprising water, a foam comprising water and gas, a gas, a mist, or a cryogenic gas.

In the above example implementations, and/or others within the scope of the present disclosure, the dirty fluid 110 may include proppant; swellable or non-swellable fibers; a curable resin; a tackifying agent; a lost-circulation material; a suspending agent; a viscosifier; a filtration control agent; a shale stabilizer; a weighting agent; a pH buffer; an emulsifier; an emulsifier activator; a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor; a mutual solvent; an oxidizer; a reducer; a friction reducer; a clay stabilizing agent; an oxygen scavenger; cement; a strength retrogression inhibitor; a fluid loss additive; a cement set retarder; a cement set accelerator; a light-weight additive; a de-foaming agent; an elastomer; a mechanical property enhancing additive; a gas migration control additive; a thixotropic additive; and/or combinations thereof.

Figure 11:
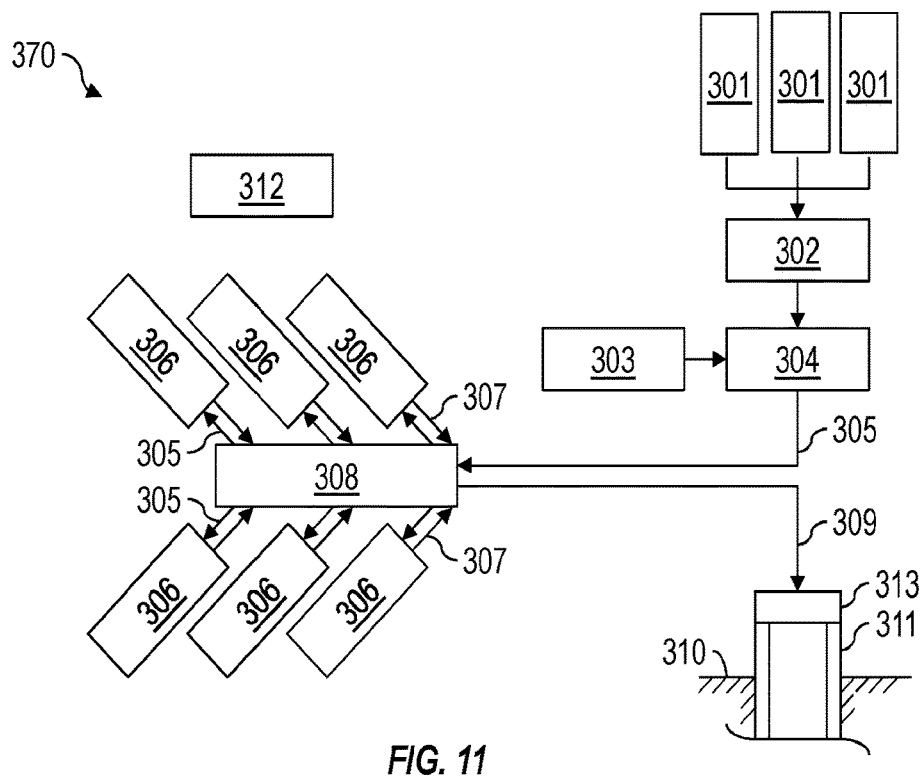
FIG. 11 is a schematic view of at least a portion of an example implementation of apparatus according to one or more aspects of the present disclosure.

FIG. 11 is a schematic view of an example wellsite system 370 that may be utilized for pumping a fluid from a wellsite surface 310 to a well 311 during a well treatment operation. Water from one or more water tanks 301 may be substantially continuously pumped to a gel maker 302, which mixes the water with a gelling agent to form a carrying fluid or gel, which may be a clean fluid. The gel may be substantially continuously pumped into a blending/mixing device, hereinafter referred to as a mixer 304. Solids, such as proppant and/or other solid additives stored in one or more solids containers 303, may be intermittently or substantially continuously pumped into the mixer 304 to be mixed with the gel to form a substantially continuous stream or supply of treatment fluid, which may be a dirty fluid. The treatment fluid may be pumped from the mixer 304 to a plurality of plunger, frac, and/or other pumps 306 through a system of conduits 305 and a manifold 308. Each pump 306 pressurizes the treatment fluid, which is then returned to the manifold 308 through another system of conduits 307. The stream of treatment fluid is then directed to the well 311 via a wellhead 313 through a system of conduits 309. A control unit 312 may be operable to control various portions of such processing via wired and/or wireless communications (not shown).

Figure 12:
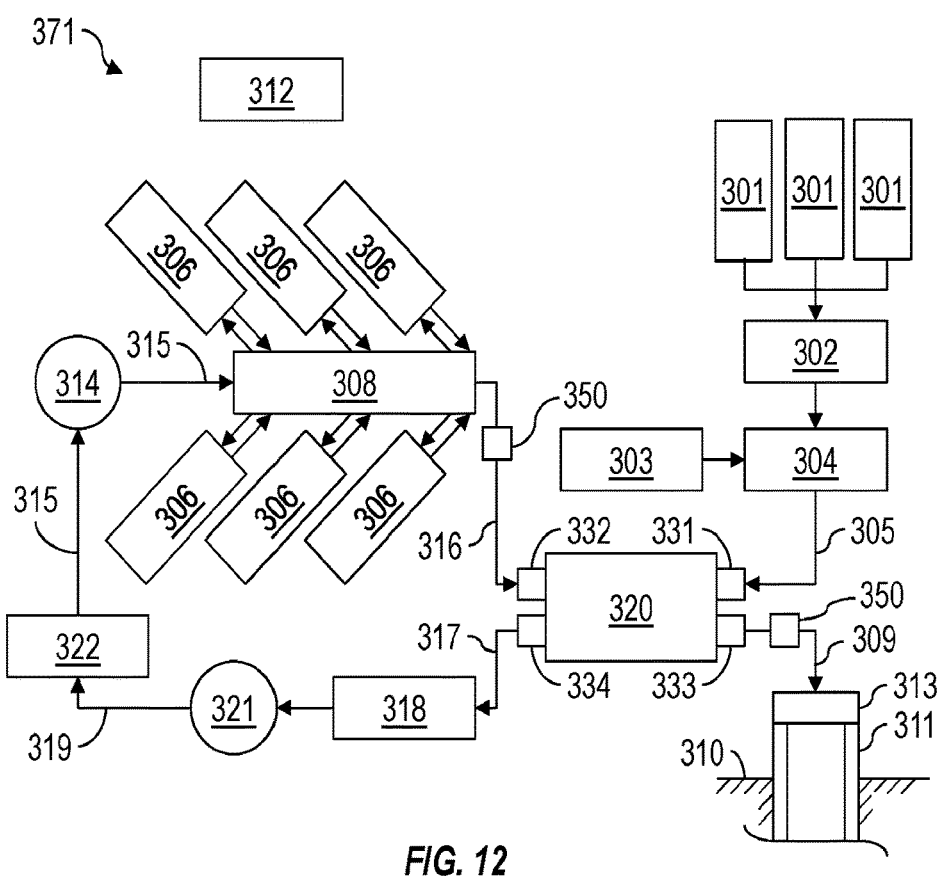
FIG. 12 is a schematic view of at least a portion of an example implementation of apparatus according to one or more aspects of the present disclosure.

FIG. 12 is a schematic view of an example implementation of another wellsite system 371 according to one or more aspects of the present disclosure. The wellsite system 371 comprises one or more similar features of the wellsite system 370 shown in FIG. 11, including where indicated by like reference numbers, except as described below.

The wellsite system 371 includes a fluid pressure exchanger 320, which may be utilized to eliminate or reduce pumping of dirty fluid through the pumps 306. The dirty fluid may be conducted from the mixer 304 to one or more chambers 100/150/250/251/274 of the fluid pressure exchanger 320 via the conduit system 305. The fluid pressure exchanger 320 may be, comprise, and/or otherwise have one or more aspects in common with the apparatus shown in one or more of FIGS. 1-10. Thus, as similarly described above with respect to FIGS. 1-10, the fluid pressure exchanger 320 comprises a non-pressurized dirty fluid inlet 331, a pressurized clean fluid inlet 332, a pressurized fluid discharge or outlet 333, and a reduced-pressure fluid discharge or outlet 334. Consequently, the pumps 306 may conduct the clean fluid to and from the manifold 308 and then to the pressurized clean fluid inlet 332 of the fluid pressure exchanger 320, where the pressurized clean fluid may be utilized to pressurize the dirty fluid received at the non-pressurized dirty fluid inlet 331 from the mixer 304.

A centrifugal or other type of boost pump 314 may supply the clean fluid to the manifold 308 from one or more holding or frac tanks 322 through a conduit system 315. An additional source of fluid to be pressurized by the manifold 308 may be flowback fluid from the well 311. The pressurized clean fluid is conducted from the manifold 308 to one or more chambers of the fluid pressure exchanger 320 via a conduit system 316. The pressurized fluid discharged from the fluid pressure exchanger 320 is then conducted to the wellhead 313 of the well 311 via a conduit system 309. The reduced-pressure clean fluid remaining in the fluid pressure exchanger 320 (or chamber 100/150 thereof) may then be conducted to one or more settling tanks/pits 318 via a conduit system 317, where the fluid may be recycled back into the high-pressure stream via a centrifugal or other type of pump 321 and a conduit system 319, such as to the tank(s) 322.

The wellsite system 371 may further comprise pressure sensors 350 operable to generate electric signals and/or other information indicative of the pressure of the clean fluid upstream of the pressure exchanger 320 and/or the pressure of the dirty fluid discharged from the pressure exchanger 320. For example, the pressure sensors 350 may be fluidly connected along the fluid conduits 309, 316. Additional pressure sensors may also be fluidly connected along the fluid conduits 305, 317, such as may be utilized to monitor pressure of the low-pressure clean and dirty fluids.

Some of the components, such as conduits, valves, and the manifold 308, may be configured to provide dampening to accommodate pressure pulsations. For example, liners that expand and contract may be employed to prevent problems associated with pumping against a closed valve due to intermittent pumping of the high-pressure fluid stream.

Figure 13:
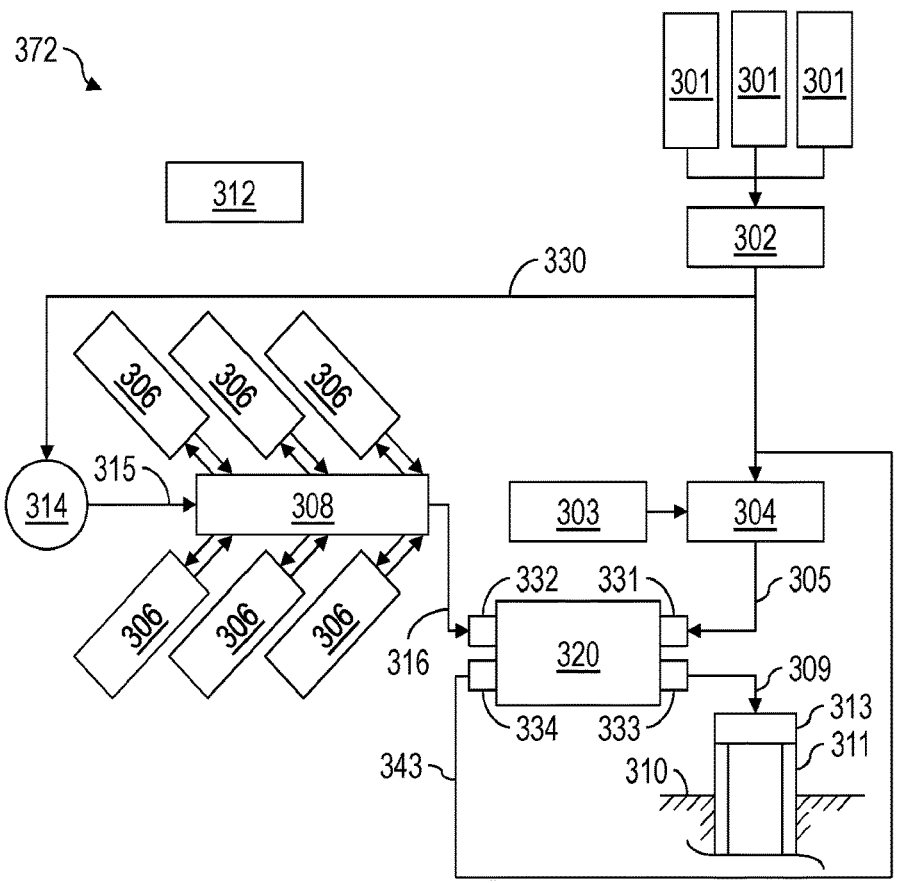
FIG. 13 is a schematic view of at least a portion of an example implementation of apparatus according to one or more aspects of the present disclosure.

FIG. 13 is a schematic view of an example implementation of another wellsite system 372 according to one or more aspects of the present disclosure. The wellsite system 372 is substantially similar in structure and operation to the wellsite system 371, including where indicated by like reference numbers, except as described below.

In the wellsite system 372, the clean fluid may be conducted to the manifold 308 via a conduit system 330, the boost pump 314, and the conduit system 315. That is, the fluid stream leaving the gel maker 302 may be split into a low-pressure side, for utilization by the mixer 304, and a high-pressure side, for pressurization by the manifold 308. Similarly, although not depicted in FIG. 13, the fluid stream entering the gel maker 302 may be split into the low-pressure side, for utilization by the gel maker 302, and the high-pressure side, for pressurization by the manifold 308. Thus, the clean fluid stream and the dirty fluid stream may have the same source, instead of utilizing the tank 322 or other separate clean fluid source.

FIG. 13 also depicts the option for the reduced-pressure fluid discharged from the fluid pressure exchanger 320 to be recycled back into the low-pressure clean fluid stream between the gel maker 302 and the mixer 304 via a conduit system 343. In such implementations, the flow rate of the proppant and/or other ingredients from the solids container 303 into the mixer 304 may be regulated based on the concentration of the proppant and/or other ingredients entering the low-pressure stream from the conduit system 343. The flow rate from the solids container 303 may be adjusted to decrease the concentration of proppant and/or other ingredients based on the concentrations in the fluid being recycled into the low-pressure stream. Similarly, although not depicted in FIG. 13, the reduced-pressure fluid discharged from the fluid pressure exchanger 320 may be recycled back into the low-pressure flow stream before the gel maker 302, or perhaps into the low-pressure flow stream between the mixer 304 and the fluid pressure exchanger 320.

Figure 14:
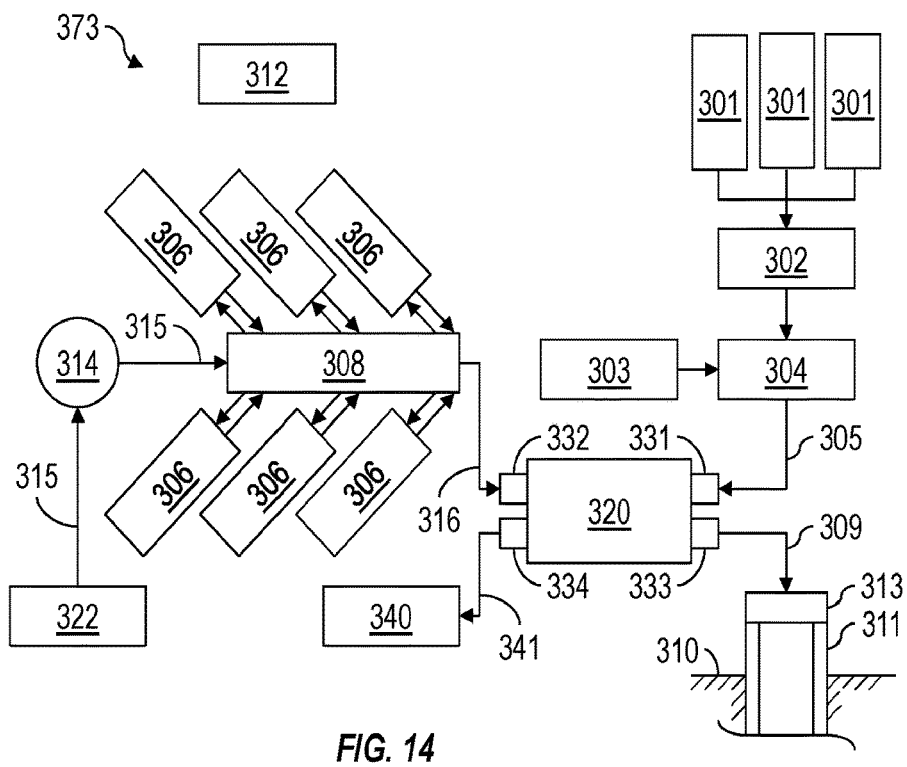
FIG. 14 is a schematic view of at least a portion of an example implementation of apparatus according to one or more aspects of the present disclosure.

FIG. 14 is a schematic view of an example implementation of another wellsite system 373 according to one or more aspects of the present disclosure. The wellsite system 373 is substantially similar in structure and operation to the wellsite system 372, including where indicated by like reference numbers, except as described below.

In the wellsite system 373, the source of the clean fluid is the tank 322, and the reduced-pressure fluid discharged from the fluid pressure exchanger 320 is not recycled back into the high-pressure stream, but is instead directed to a tank 340 via a conduit system 341. However, in similar implementations, the reduced-pressure fluid discharged from the fluid pressure exchanger 320 may not be recycled back into the high-pressure stream, as depicted in FIG. 13. In either case, utilizing the tank 322 or other source of the clean fluid separate from the discharge of the gel maker 302 and the fluid pressure exchanger 320 may permit a single-pass clean fluid system with very low probability of proppant entering the pumps 306.

Figure 15:
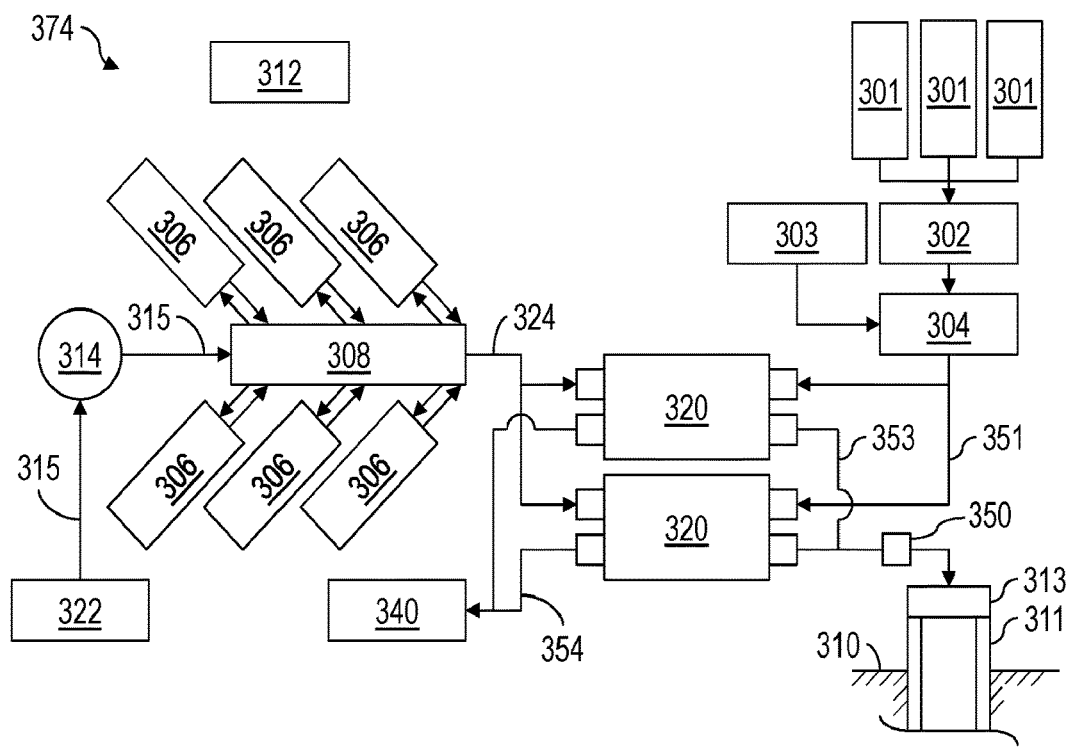
FIG. 15 is a schematic view of at least a portion of an example implementation of apparatus according to one or more aspects of the present disclosure.

FIG. 15 is a schematic view of an example implementation of another wellsite system 374 according to one or more aspects of the present disclosure. The wellsite system 374 is substantially similar in structure and operation to the wellsite system 373, including where indicated by like reference numbers, except as described below.

Unlike the wellsite system 373, the wellsite system 374 utilizes multiple instances of the fluid pressure exchanger 320. The low-pressure discharge from the mixer 304 may be split into multiple streams each conducted to a corresponding one of the fluid pressure exchangers 320 via a conduit system 351. Similarly, the high-pressure discharge from the manifold 308 may be split into multiple streams each conducted to a corresponding one of the fluid pressure exchangers 320 via a conduit system 352. The pressurized fluid discharged from the fluid pressure exchangers 320 may be combined and conducted towards the well 311 via a conduit system 353, and the reduced-pressure discharge from the fluid pressure exchangers 320 may be combined or separately conducted to the tank 340 via a conduit system 354.

Figure 16:
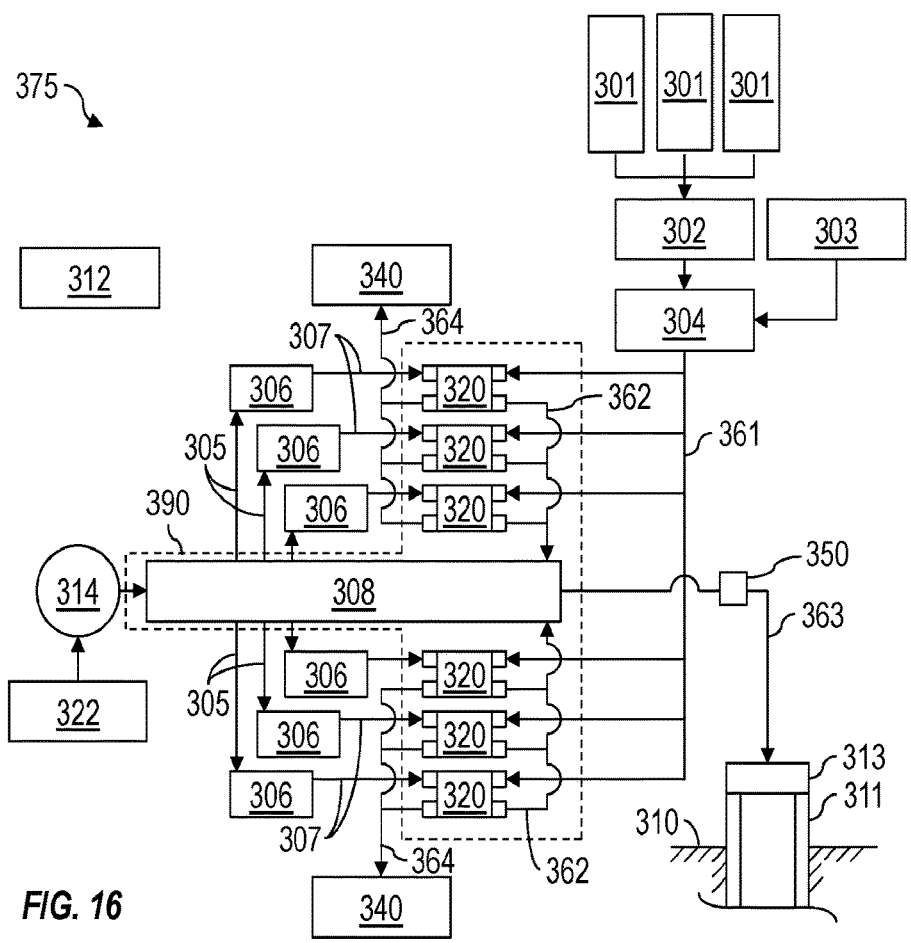
FIG. 16 is a schematic view of at least a portion of an example implementation of apparatus according to one or more aspects of the present disclosure.

FIG. 16 is a schematic view of an example implementation of another wellsite system 375 according to one or more aspects of the present disclosure. The wellsite system 375 is substantially similar in structure and operation to the wellsite system 373, including where indicated by like reference numbers, except as described below.

Unlike the wellsite system 373, the wellsite system 375 includes multiple instances of the fluid pressure exchanger 320 between the manifold 308 and a corresponding one of the pumps 306. The low-pressure discharge from the mixer 304 may be split into multiple streams each conducted to a corresponding one of the fluid pressure exchangers 320 via a corresponding conduit of a conduit system 361. The high-pressure discharge from each of the pumps 306 may be conducted to a corresponding one of the fluid pressure exchangers 320 via corresponding conduits 307. The pressurized fluid discharged from each fluid pressure exchanger 320 is returned to the manifold 308 for combination, via a conduit system 362, and then conducted towards the well 311 via an injection conduit 363. The reduced-pressure discharge from the fluid pressure exchangers 320 may be combined or separately conducted to one or more tanks 340 via a conduit system 364.

One or more of the pressure exchangers 320 may be integrated or otherwise combined with the manifold 308 as a single unit or piece of wellsite equipment. For example, one or more of the pressure exchangers 320 and the manifold 308 may be combined to form a manifold 390 comprising fluid pathways and connections of the manifold 308 and one or more of the pressure exchangers 320 hard-piped or otherwise integrated with or along such fluid pathways and connections. Accordingly, the mixer 304 and each pump 306 may be fluidly connected with corresponding inlet ports of the manifold 390 instead of with individual inlet ports 331, 332 of the pressure exchangers 320. For example, the manifold 390 may comprise a plurality of clean fluid inlet ports each fluidly connected with a corresponding fluid conduit 307 to receive the clean fluid from the pumps 306. Each clean fluid inlet port may in turn be fluidly connected with the clean fluid inlet 332 of a corresponding pressure exchanger 320. The manifold 390 may further comprise a plurality of dirty fluid inlet ports, each fluidly connected with a corresponding fluid conduit of the conduit system 361 and operable to receive the dirty fluid from the mixer 304. Each dirty fluid inlet port may in turn be fluidly connected with the dirty fluid inlet 331 of a corresponding pressure exchanger 320. The manifold 390 may also comprise a plurality of clean fluid outlet ports, each fluidly connected with a corresponding fluid conduit of the conduit system 364 and operable to discharge the clean fluid from the manifold 390. Each clean fluid outlet port may in turn be fluidly connected with the clean fluid outlet 334 of a corresponding pressure exchanger 320. The manifold 390 may also comprise a dirty fluid outlet port fluidly connected with the injection conduit 363 and operable to discharge the dirty fluid from the manifold 390. The dirty fluid outlet port may in turn be fluidly connected with the dirty fluid outlets 333 of the pressure exchangers 320.

The wellsite system 371 may further comprise a plurality of pressure sensors 350, each operable to generate an electric signal and/or other information indicative of pressure of the clean fluid being injected into the pressure exchanger 320 and/or pressure of the dirty fluid discharged from the pressure exchanger 320. For example, a pressure sensor 350 may be fluidly connected along each of the fluid conduits 307 or otherwise at each of the fluid inlets 332 of the pressure exchangers 320 to monitor pressure of the clean fluid being injected into each pressure exchanger 320. A pressure sensor 350 may also be fluidly connected along each of the injection conduit 363 or otherwise at each of the fluid outlets 333 of the pressure exchangers 320 to monitor pressure of the dirty fluid being discharged from each pressure exchanger 320. A pressure sensor 350 may also or instead be fluidly connected along the injection conduit 363 to measure pressure of the combined dirty fluid being injected into the well 311. A pressure sensor 350 may also be implemented as part of a downhole tool (not shown), which may be conveyed or installed within the well 311.

Combinations of various aspects of the example implementations depicted in FIGS. 12-16 are also within the scope of the present disclosure. For example, the high-pressure side may comprise a dual-stage pumping scheme that pumps a clean fluid from the pumps 306 at a medium pressure and pumps flowback fluid into the clean fluid stream to increase the pressure of the pressurized fluid entering the fluid pressure exchanger 320.

A wellsite system within the scope of the present disclosure may be utilized to form a substantially continuous stream or supply of dirty fluid having a predetermined solids concentration before being pressurized by one or more pressure exchangers and injected into a well during a well treatment operation. For example, the solids concentration of the dirty fluid stream being formed and injected into the well may be held substantially constant during the well treatment operation. However, the solids concentration of the dirty fluid may be dynamically varied during the well treatment operation.

Figure 17:
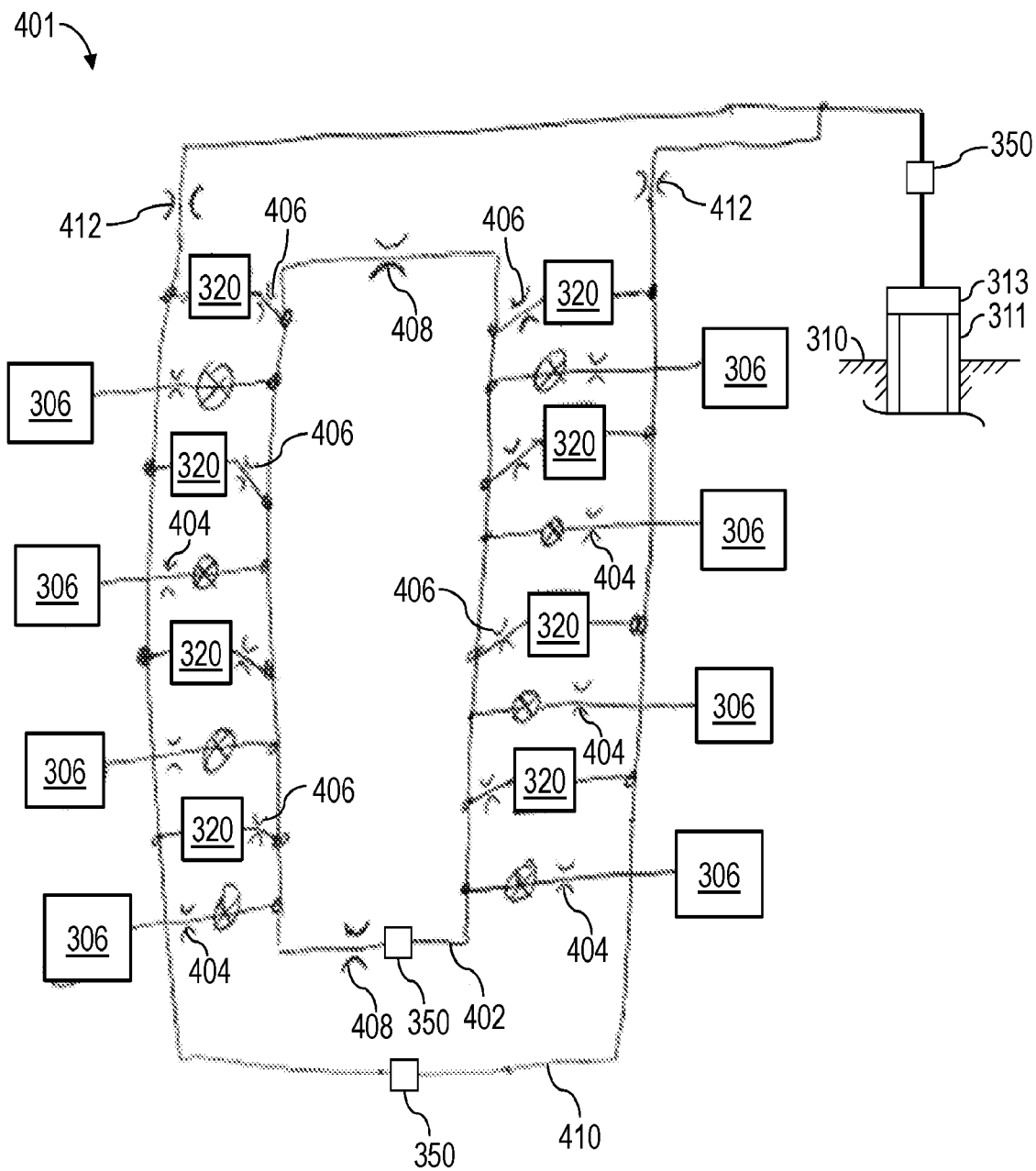
FIG. 17 is a schematic view of at least a portion of an example implementation of apparatus according to one or more aspects of the present disclosure.
Figure 18:
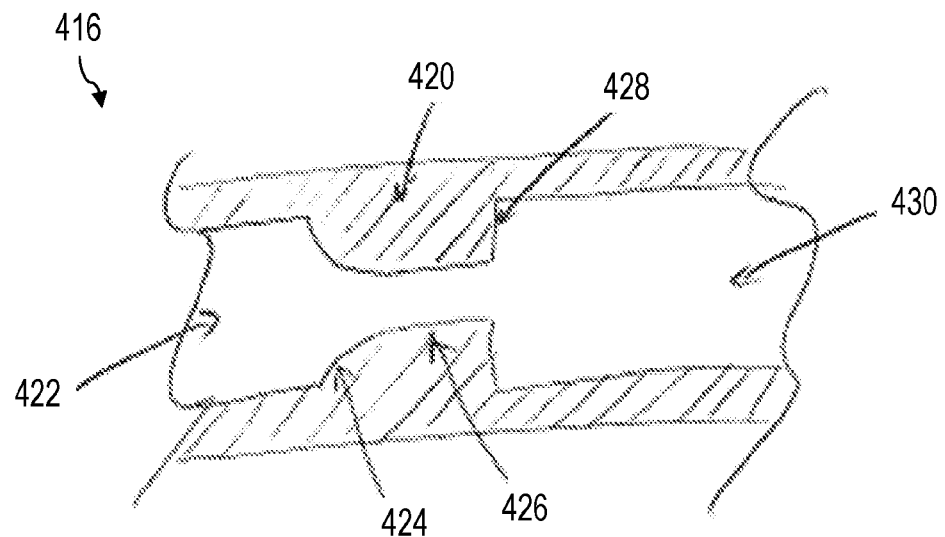
FIGS. 18 and 19 are schematic sectional views of at least a portion of an example implementation of apparatus according to one or more aspects of the present disclosure.

Apparatus and systems within the scope of the present disclosure may be further operable or utilized for reducing effects of pipe work and manifold resonance vibrations by utilizing vibration reducing pipe work configurations and/or incorporating vibration reducing damping elements. FIG. 17 is a schematic view of at least a portion of an example implementation of a high-pressure fluid system 401 of a wellsite system 400 according to one or more aspects of the present disclosure. FIG. 18 is a schematic view of at least a portion of an example implementation of a low-pressure fluid system 403 of the wellsite system 400 according to one or more aspects of the present disclosure. The high-pressure fluid system 401 and the low-pressure fluid system 403 may incorporate damping elements on both the dirty and clean fluid sides of the pressure exchangers 320. The wellsite system 400 comprises one or more features of the wellsite systems 371-375, including where indicated by like reference numbers, except as described below. Accordingly, one or more aspects of the following description may also refer to one or more of FIGS. 1-16. Furthermore, although not shown in FIGS. 12-16, the various features associated with the wellsite system 400 may be implemented as part of the wellsite systems 371-375.

The wellsite system 400 may comprise a plurality of tanks 301 containing water or another clean fluid, and one or more gel makers 302 operable to receive the water from the tanks 301 and a gelling agent to form a gel or another clean fluid. The clean fluid formed in the gel maker 302 may be fed to a plurality of pumps 306. The clean fluid may be transferred from the gel maker 302 to a low-pressure clean fluid distribution manifold 448 (e.g., a header), from which the clean fluid may be distributed among the pumps 306. A boost pump 314, such as a centrifugal pump, may be utilized to transfer the clean fluid from the gel maker 302 to the manifold 448. The pumps 306 may pressurize the clean fluid and inject the clean fluid into a high-pressure manifold 402, which passes the clean fluid into high-pressure inlets 332 (shown in FIGS. 12-14) of a plurality of pressure exchangers 320. Each pump 306 may be fluidly connected with the manifold 402 via a corresponding fluid conduit 414.

The wellsite system 400 may further comprise a mixer 304 operable to receive the clean fluid from the gel maker 302 and solid particles (e.g., a proppant material) to form a dirty fluid (e.g., a fracturing fluid). The dirty fluid formed by the mixer 304 may be distributed among the pressure exchangers 320 to be pressurized. The dirty fluid may be fed into low-pressure inlets 331 (shown in FIGS. 12-14) of the pressure exchangers 320 via a low-pressure dirty fluid distribution manifold 452 (e.g., a header).

When the clean and dirty fluids are received by the pressure exchangers 320, the pressurized clean fluid pressurizes the low-pressure dirty fluid, as described above in association with FIGS. 1-7. The pressurized dirty fluid is then discharged via outlets 333 (shown in FIGS. 12-14) of the pressure exchangers 320 into a high-pressure collection manifold 410, from which an injection conduit 363 may transfer the pressurized dirty fluid for injection into the well 311. The depressurized clean fluid may be discharged via low-pressure outlets 334 (shown in FIGS. 12-14) of the pressure exchangers 320 and directed to a clean fluid destination, such as a collection tank 340.

The high-pressure fluid system 401 may comprise one or more strategically coupled damping orifices. The damping orifices may be optimally located on the clean fluid side of the pressure exchangers 320 to reduce erosion damage to the damping orifices. A damping orifice 404 may be coupled between the manifold 402 and an outlet of each pump 306 to dampen the pressure oscillations (e.g., fluctuations or spikes) within the pressurized clean fluid being fed into the manifold 402. Each damping orifice 404 may be coupled along a corresponding fluid conduit 414 or at the outlet of each corresponding pump 306. A damping orifice 406 may be coupled between the manifold 402 and the inlet 332 of each pressure exchanger 320 to dampen the pressure oscillations that may be present within the pressurized clean fluid being transferred from the manifold 402 into the pressure exchangers 320. Each damping orifice 406 may be coupled at the inlet 332 of each corresponding pressure exchanger 320. The pressure exchangers 320 may operate as acoustic conduits or as acoustic reflectors. When operating as acoustic reflectors, the damping orifices 406 coupled at close distances to the pressure exchangers 320 may not cause or have substantial damping effect. However, pressure exchangers 320 that operate as acoustic conduits may benefit from the nearby damping orifices 406.

Each of the manifolds 402, 410 may be configured as a closed loop, which may be operable to change the resonant mode of the manifolds 402, 410 from a closed end to a loop, thus cutting the first mode frequency in half. One or more damping orifices 408 may be coupled along the manifold 402 to dampen pressure oscillations that may be present within the pressurized clean fluid within the manifold 402. The damping orifices 408 may be coupled with the manifold 402 such that they are separated from each other by one or more fluid connections with the outlets of the pumps 306, such as connections with the fluid conduits 414. Similarly, one or more damping orifices 412 may be coupled along the manifold 410 to dampen pressure oscillations that may be present within the pressurized dirty fluid within the manifold 410 and/or to dampen pressure oscillations transmitted into the well 311 via the injection conduit 363. The damping orifices 412 may be coupled with the manifold 410 such that they are separated from each other by one or more fluid connections with the outlets of the pressure exchangers 320. The damping orifices 412 may be more effective when coupled at a substantial distance from ends of pipes or other conduits forming the manifold 410. The damping orifices 412 may be optimally coupled at points of maximum acoustic velocity of the manifold 410.

The wellsite system 400 may further comprise one or more pressure and/or flow rate sensors 405 operable to generate electric signals and/or other information indicative of pressure and/or flow rate of the clean or dirty fluid at various locations of the wellsite system 400. For example, the sensors 405 may be fluidly connected along the injection conduit 363 fluidly connected with the wellhead 313. The sensors 405 may also or instead be fluidly connected along the manifolds 402, 410, 448, 452.

Figure 19:
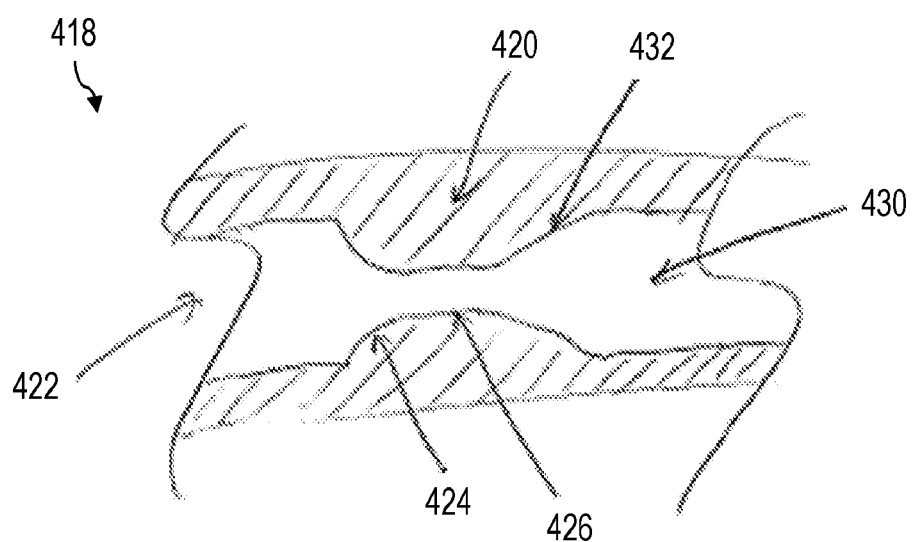
Figure 20:
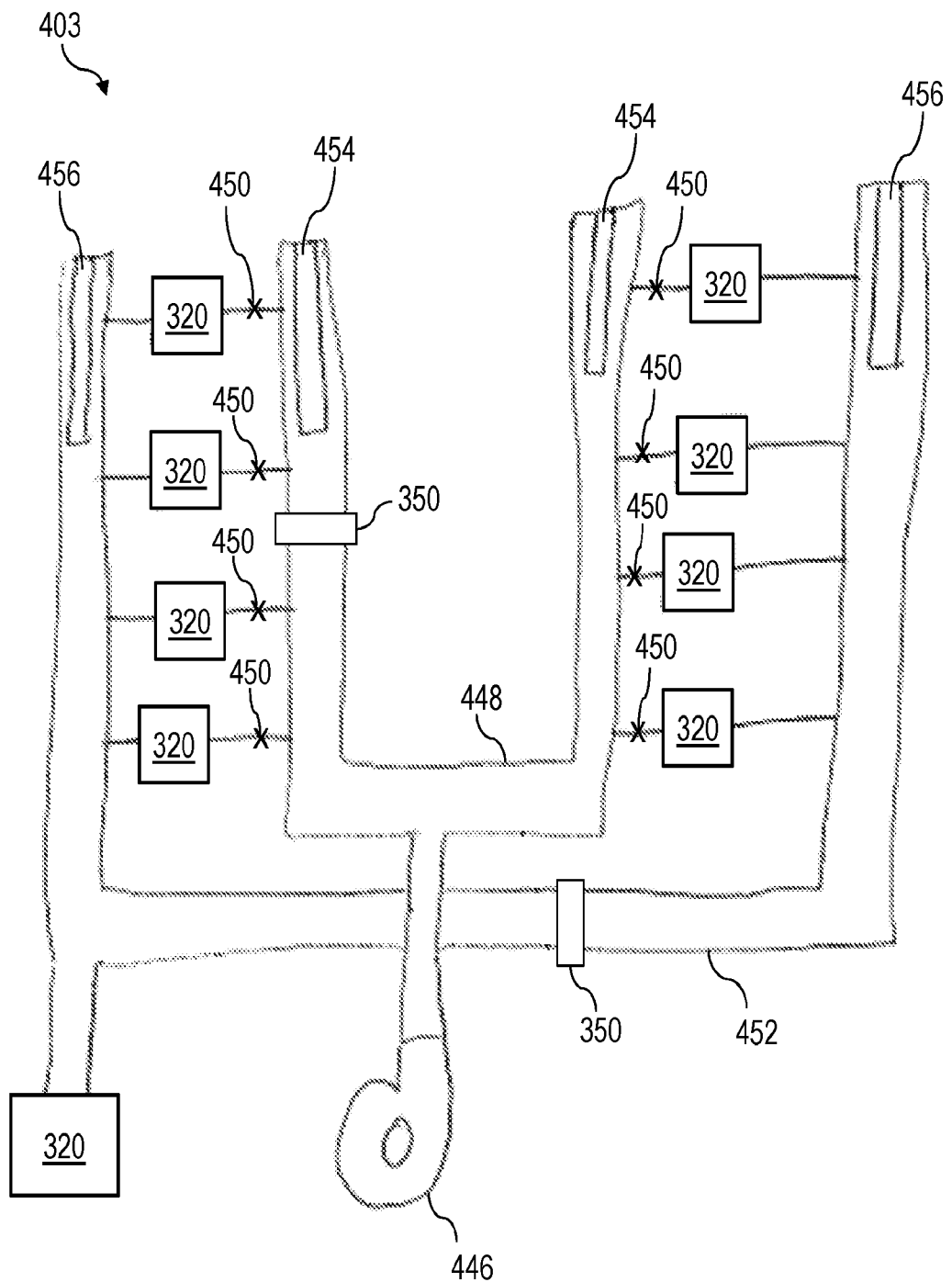
FIG. 20 is a schematic view of at least a portion of an example implementation of apparatus according to one or more aspects of the present disclosure.

FIGS. 19 and 20 are schematic sectional views of example implementations of the damping orifices 404, 406, 408, 412 according to one or more aspects of the present disclosure and designated in FIGS. 19 and 20 by numerals 416, 418, respectively. Each damping orifice 416, 418 may be or comprise a flow restricting, pressure reducing orifice having a housing 420 with an entrance 422 leading to a radiused acceleration area 424 and a straight area 426. The damping orifice 416 may further comprise a sharp transition 428 leading to an exit area 430, while the damping orifice 418 may comprise a tapered transition area 432, such as having a 15 degree included angle that smoothly slows the fluid velocity down to the exit area 430. When installed along manifolds and other fluid conduits of a wellsite system according to one or more aspects of the present disclosure, the damping orifices 416, 418 may dampen or otherwise reduce the amplitude of fluid pressure oscillations, fluctuations, pulsations, or spikes generated by the pumps 306, the pressure exchangers 320, and/or other wellsite equipment fluidly connected with such manifolds and other fluid conduits.

Figure 21:
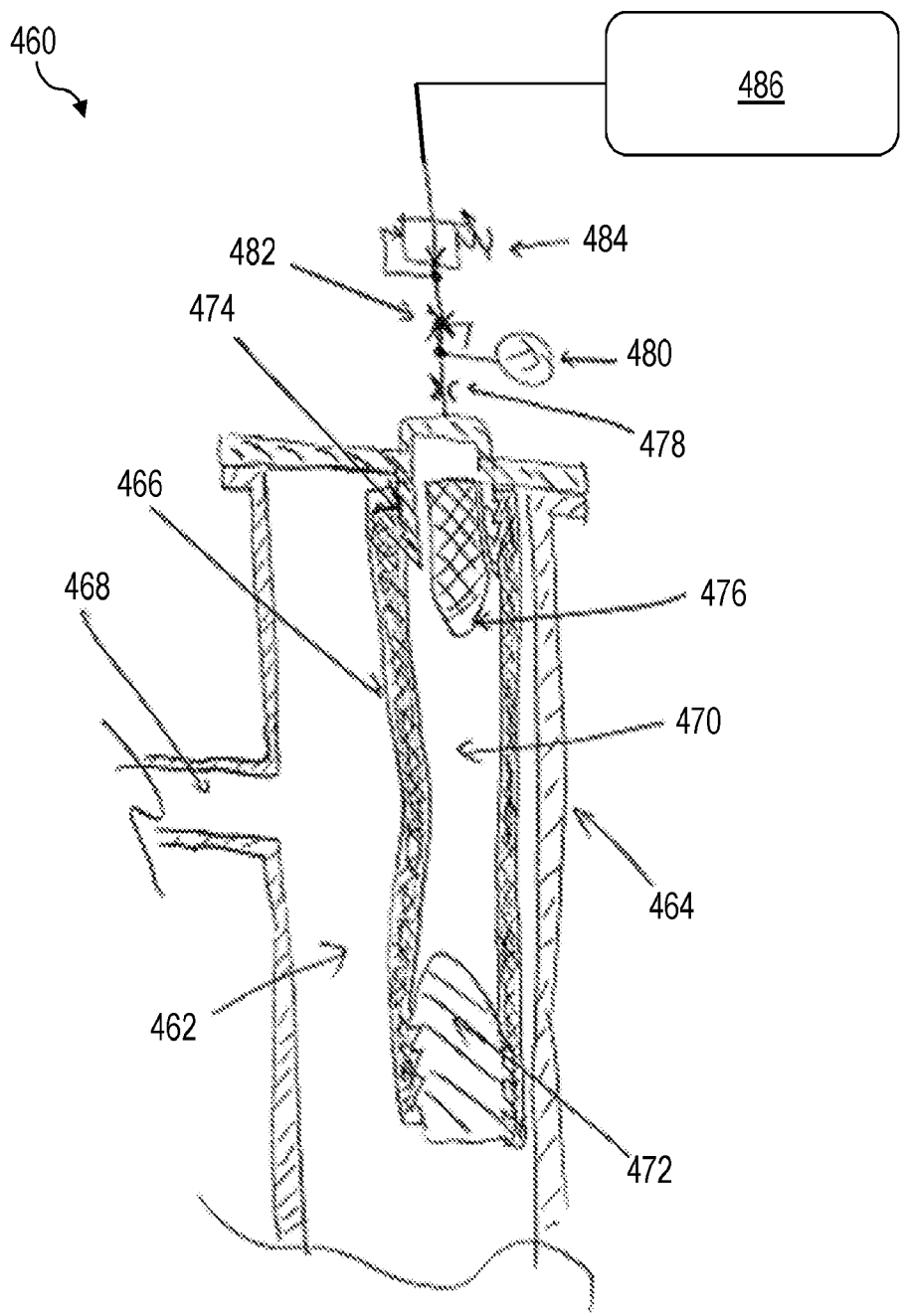
FIG. 21 is a schematic sectional view of at least a portion of an example implementation of apparatus according to one or more aspects of the present disclosure.

As further shown in FIG. 18, the low-pressure fluid system 403 may comprise a plurality of strategically coupled compliance hydraulic shock damping elements 454, 456, such as may be operable to suppress fluid hammer shocks or pulses (e.g., hydraulic shocks, water hammer shocks). The damping elements 454 may be inserted into or otherwise coupled with the manifold 448, and the damping elements 456 may be inserted into or otherwise coupled with the manifold 452. FIG. 21 is a schematic sectional view of at least a portion of an example implementation of a hydraulic shock damping element 460 according to one or more aspects of the present disclosure. The damping element 460 may be implemented in the low-pressure fluid system 403 as one or both of the damping elements 454, 456.

The damping element 460 may be at least partially positioned within a low-pressure fluid distribution (e.g., supply) manifold 462, such as the clean or dirty fluid manifolds 448, 452. The damping element 460 may comprise a flexible member 466 disposed against a wall 464 of the manifold 462, opposite a fluid passage 468, which may supply the low-pressure clean fluid to the pumps 306 or the low-pressure dirty fluid to the pressure exchangers 320. The flexible member 466 may be a molded reinforced rubber structure having a generally tubular configuration. A reinforced flexible (e.g., rubber) hose operable to contain intended internal pressures may also be utilized as the flexible member 466. An internal chamber 470 defined by the flexible member 466 may be filled with a pressurized gas, which may be passed into the internal chamber 470 from a nearby or remote gas source 486 via a gas conduit 488. The gas may be pressurized to a pressure that is about half of the intended pressure of the clean or dirty fluid within the manifold 462. An end plug 472 may be disposed within the flexible member 466 at an end of the flexible member 466. The end plug 472 may comprise external clamping means (e.g., external barbs), such as to prevent the plug 472 from being ejected from the flexible member 466. The plug 472 may be provided with an internal end 473, which may prevent damage to the flexible member 466 when the flexible member 466 is compressed about the internal end 473. The internal end 473 may comprise a rounded, tapered, or conical configuration, may be partially flattened, and/or may comprise a rubber plug that can conform to the internal shape of the flexible member 466. The flexible member 466 may also or instead be formed into a shape such that a separate plug 472 is not utilized. An opposing end of the flexible member 466 may be attached to a mount 474, which may be barbed to improve the grip on the flexible member 466. An insert 476 may be disposed at the opposing end of the flexible member 466 to prevent the flexible member 466 from being crushed onto the mount 474 and damaged.

An adjustable orifice 478 or flow rate control valve may be provided along the conduit 488 to limit the rate of change of gas pressure within the chamber 470 of the flexible member 466. A pressure gauge 480 may be connected with the conduit 488 to monitor gas pressure within the chamber 470. A fluid shut-off valve 482 may be included along the conduit 488 to selectively fluidly connect and disconnect the chamber 470 to and from the gas source 486. A regulator 484 may be connected along the conduit 488 to control gas pressure within the chamber 470. Instead of or in addition to gas, the chamber 470 of the flexible member 466 may be filled with a foam member or foam particles having gas trapped therein under pressure to facilitate dampening operations.

Figure 22:
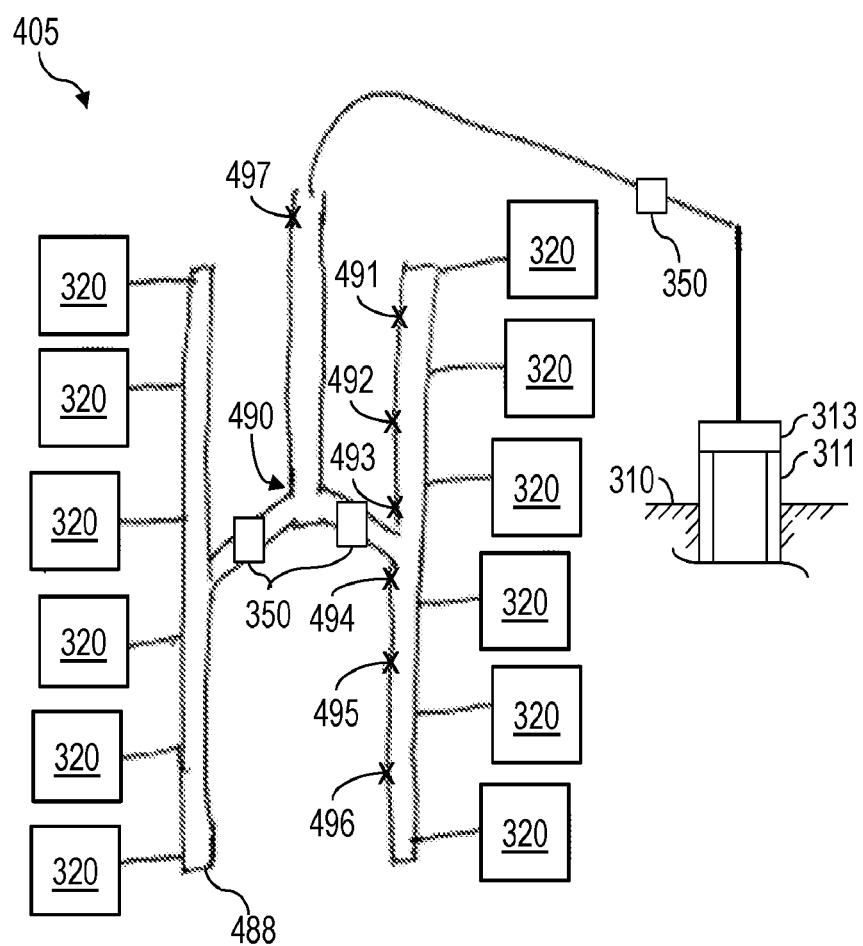
FIG. 22 is a schematic view of at least a portion of an example implementation of apparatus according to one or more aspects of the present disclosure.
Figure 23:
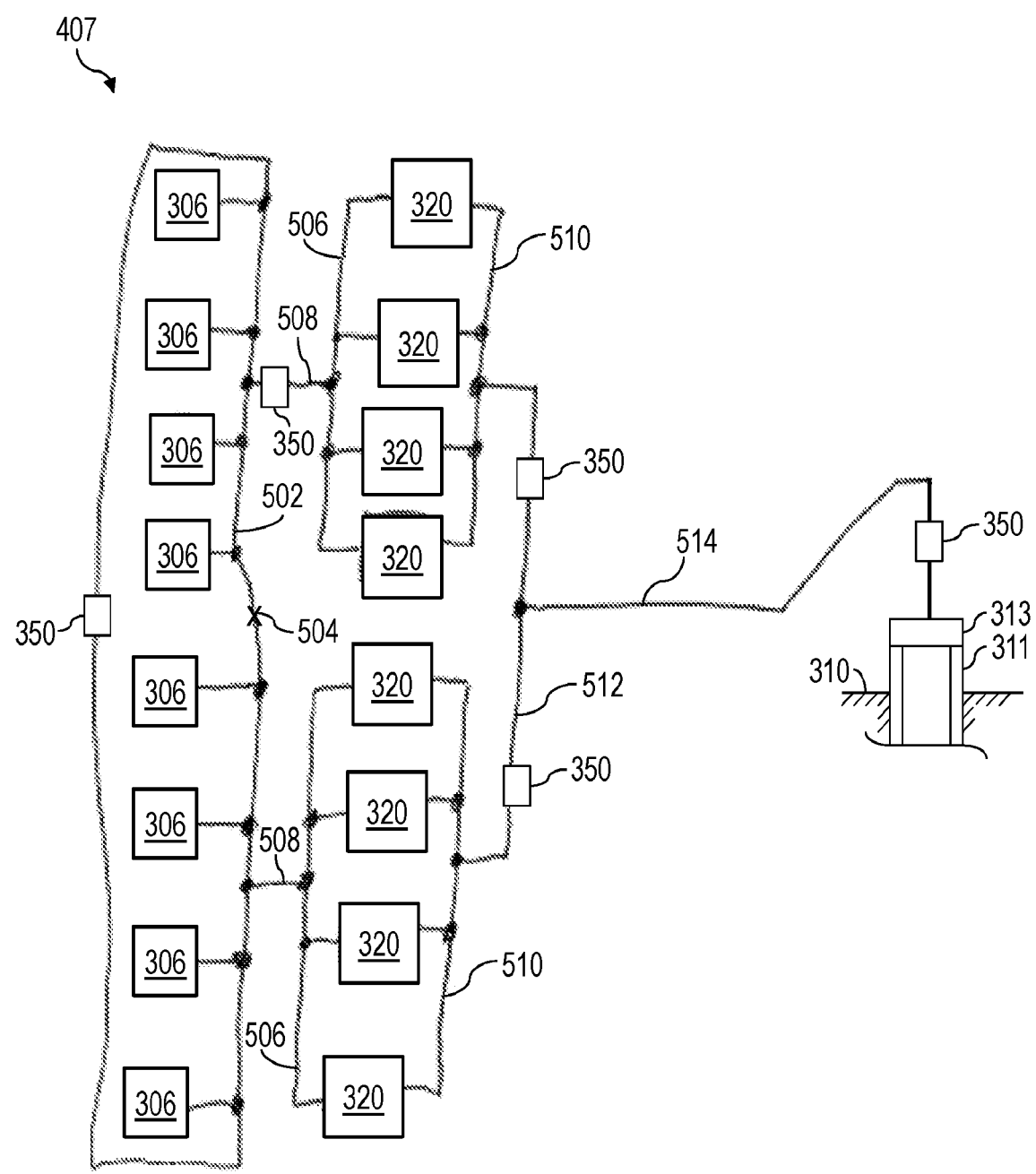
FIG. 23 is a schematic view of at least a portion of an example implementation of apparatus according to one or more aspects of the present disclosure.

FIGS. 22 and 23 are schematic views of at least a portion of example implementations of high-pressure fluid systems 502, 504, respectively, of corresponding wellsite systems according to one or more aspects of the present disclosure. The fluid systems 502, 504 comprise one or more features of the wellsite systems 371-375, including where indicated by like reference numbers, except as described below. Accordingly, one or more aspects of the following description may also refer to one or more of FIGS. 1-16. Furthermore, although not shown in FIGS. 12-18, the various features associated with the high-pressure fluid systems 502, 504 described below may be implemented as part of the wellsite systems 371-375 and 400.

The fluid system 502 incorporates damping means on the high-pressure dirty fluid side of a plurality of pressure exchangers 320. The fluid system 502 comprises a high-pressure collection manifold 510 fluidly connected with the pressure exchangers 320 and operable to collect the pressurized dirty fluid discharged via the outlets 333 of the pressure exchangers 320. The manifold 510 has a generally H-shaped geometry, comprising two opposing substantially straight manifold portions 512 (e.g., conduits, runs) with a connection conduit 514 fluidly connecting the manifold portions 512 to combine the dirty fluid received by the manifold portions 512 from the pressure exchangers 320. The connection conduit 514 may be connected with a discharge conduit 516 of the manifold 510, such as may be configured to receive the pressurized dirty fluid from the connection conduit 514 and transfer the dirty fluid toward or into an injection conduit 363 fluidly connected with a well 311 to permit the dirty fluid to be injected into the well 311. The H-shaped geometry of the manifold 510 may reduce the maximum resonant length of the manifold 510.

The manifold 510 may include a plurality of damping orifices, such as the damping orifices 416, 418 shown in FIGS. 19 and 20, coupled at one or more positions along the manifold 510. Positions 521, 526 may be located between the two outermost pressure exchangers 320 of each manifold portion 512. However, such positions 521, 526 may not be optimal if such positions 521, 526 are too close to outermost ends of the manifold portions 412. Positions 522, 525 may be located at sufficient distances from the outermost ends of the manifold portions 412. The damping orifices 416, 418 may be fluidly connected along the manifold 410 such that each damping orifice 416, 418 passes the pressurized dirty fluid discharged by no more than two of the pressure exchangers 320, which may reduce erosion of the damping orifices 416, 418 caused by the dirty fluid. For example, a damping orifice 416, 418 located at each of the positions 522, 525 may be exposed to flows of pressurized dirty fluid from just one or two pressure exchangers 320. Furthermore, the low flow rates of dirty fluid associated with positions 522, 525 may ease the challenge of sizing the damping orifices 416, 418 at positions 522, 525. Positions 523, 524 are also located at sufficient distances from the corresponding outermost ends of the manifold portions 412. However, the positions 523, 524 expose the damping orifices 416, 418 to flows of dirty fluid from up to three pressure exchangers 320, which may increase erosion of the damping orifices 416, 418 caused by the dirty fluid. Positions 527, 528 are centrally located and expose the damping orifices 416, 418 to flows of dirty fluid from up to twelve (i.e., all) pressure exchangers 320. Furthermore, flow rates of pressurized dirty fluid at positions 527, 528 vary substantially, depending on the number of pressure exchangers 320 operated. Furthermore, a damping orifice 416, 418 located at position 527 may be readily accessible to permit the damping orifice 416, 418 to be changed out to match a given job. The damping orifices 416, 418 may be matched to a job based on, for example, dirty fluid flow rates and type of dirty fluid utilized. The position 528 may be more difficult to access to change out a damping orifice 416, 418, unless a dedicated change out port is incorporated at that location.

The fluid system 502 may further comprise one or more of the pressure and/or flow rate sensors 405 operable to generate electric signals and/or other information indicative of pressure and/or flow rate of the clean or dirty fluid at various locations of the fluid system 502. For example, a sensor 405 may be fluidly connected along the connection conduit 514 on each side of the discharge conduit 516 and/or along the injection conduit 363 fluidly connected with the well 311.

The fluid system 504 incorporates damping means on both the clean fluid and dirty fluid high-pressure sides of a plurality of pressure exchangers 320. The wellsite system 504 comprises a high-pressure collection manifold 530 fluidly connected with a plurality of pumps 306 and operable to collect pressurized clean fluid discharged by the pumps 306. The manifold 530 may comprise a closed loop geometry, such as may drive down the resonant frequency of the manifold 530. Although not shown in FIG. 23, one or both of the manifolds 536, 538 may comprise a closed loop geometry similar to that of manifold 530. However, the manifold 530 may instead comprise a straight run geometry (i.e., having opposing ends not connected to form a loop), which may raise the resonant frequency of the manifold 530. A damping orifice 416, 418 may be coupled along the manifold 530 at one or more of positions 532, 534, at which net flow rate of pressurized clean fluid may be about zero or otherwise negligible. However, the net flow rates at positions 532, 534 may not be negligible, for example if one or more of the pumps 306 and/or the pressure exchangers 320 are operating in an unbalanced manner (e.g., at flow rates that are higher or lower than the flow rates of the remaining ones of the pumps 306 and/or pressure exchangers 320) causing certain pumps 306 to discharge the clean fluid at higher or lower flow rates.

The pressure exchangers 320 of the fluid system 504 may be divided into multiple arrays or groups, each fluidly connected together by corresponding distribution and collection manifolds 536, 538. Each distribution manifold 536 may be connected with a high-pressure inlet 332 of each pressure exchanger 320 to feed the pressurized clean fluid into each pressure exchanger 320, while each collection manifold 538 may be connected with a high-pressure outlet 333 of each pressure exchanger 320 to receive the pressurized dirty fluid from each pressure exchanger 320. Each distribution manifold 536 (i.e., header) may be fluidly connected with the collection manifold 530 via a corresponding fluid conduit 540 to fluidly connect the pumps 306 with the pressure exchangers 320. Each fluid conduit 540 may be connected with the manifold 530 at locations between equal number of pumps 306 such that an equal number of pumps 306 feed into each conduit 540, resulting in an even division of flow between the conduits 540 and, thus, the lowest flow rates along the conduits 540 and along the manifold 530. For example, each conduit 540 may be connected with the manifold 530 such that four pumps 306 feed into each conduit 540 with two pumps 306 located on each side of the conduit 540. Similarly, each fluid conduit 540 may be connected with the distribution manifold 536 at a location between an equal number of pressure exchangers 320. Accordingly, the positions 532, 534 of the manifold 530 associated with zero or negligible flow may be located at a midpoint between the pumps 306 and/or the conduits 540 (or two adjacent conduits 540 if additional conduits 540 and manifolds 536, 538 are utilized), whereby the dirty fluid on one side of the positions 532, 534 flows in one direction toward one of the conduits 540 while the dirty fluid on the opposing side of the positions 532, 534 flows in the opposing direction toward the other one of the conduits 540.

Each collection manifold 538 may feed into a secondary collection manifold 542 or collection pipes. The secondary collection manifold 542 may be connected with each collection manifold 538 at a location between an equal number of pressure exchangers 320. The collection manifold 542 may be fluidly connected with a discharge conduit 544, an injection conduit 363, and/or another conduit fluidly connected with the well 311, such as may permit the pressurized dirty fluid to be injected into the well 311.

Although the fluid system 504 is shown comprising the pressure exchangers 320 divided or separated into two sets or arrays of pressure exchangers 320 each fluidly connected with the manifold 530 via a corresponding conduit 540, it is to be understood that the fluid system 504 may be implemented with three, four, or more sets or arrays of pressure exchangers 320, each array connected together by corresponding manifolds 536, 538 and connected with the manifold 530 via a corresponding conduit 540.

Additional damping orifices 416, 418 may be coupled at various locations along the fluid system 504, with attendant advantages and disadvantages described above in association with FIGS. 17-22. The configuration of the fluid system 504 may reduce lengths of fluid conduits forming the manifolds and other portions of the fluid system 504, such as the conduits 540 and the pipes forming the manifolds 530, 536, 538, 542. The configuration of the fluid system 504 may also reduce maximum flow rates through the fluid conduits and, thus, reduce the sizes of the conduits. For example, just the discharge conduit 544 and the injection conduit 363 of the fluid system 504 experiences full flow rate generated by the pumps 306 and the pressure exchangers 320, wherein the conduits 540 and the manifold 542 experience about half of the full flow rate generated by the pumps 306 and the pressure exchangers 320.

The fluid system 504 may further comprise one or more of the pressure and/or flow rate sensors 405 operable to generate electric signals and/or other information indicative of pressure and/or flow rate of the clean or dirty fluid at various locations of the fluid system 504. For example, a sensor 405 may be fluidly connected along each leg of the manifold 542 on each side of the discharge conduit 544 and/or along the injection conduit 363. The sensors 405 may be fluidly connected along the discharge conduit 544 and/or along the injection conduit 363 fluidly connected with the wellhead 313. Pressure sensors 405 may also be fluidly connected along the conduits 540 and/or the manifold 530.

In view of the entirety of the present disclosure, including the figures and the claims, a person having ordinary skill in the art will readily recognize that the present disclosure introduces an apparatus comprising a wellsite system operable to inject a pressurized dirty fluid into a wellbore during a well treatment operation, wherein the wellsite system comprises: a first manifold; a plurality of pumps each having a high-pressure outlet fluidly connected with the first manifold, wherein each of the pumps is operable to inject a pressurized clean fluid into the first manifold; a second manifold; a plurality of pressure exchangers each having a high-pressure inlet fluidly connected with the first manifold and a high-pressure outlet fluidly connected with the second manifold, wherein each of the pressure exchangers is operable to receive the pressurized clean fluid from the first manifold and discharge the pressurized dirty fluid into the second manifold; a first flow restricting orifice fluidly connected along the first manifold; a second flow restricting orifice fluidly connected along the second manifold; and a discharge conduit fluidly connected between the second manifold and the wellbore.

The wellsite system may comprise a third flow restricting orifice fluidly connected along the first manifold, and the first and third flow restricting orifices may be separated from each other by one or more fluid connections with the high-pressure outlets of the pumps.

The wellsite system may comprise a third flow restricting orifice fluidly connected along the second manifold, and the first and third flow restricting orifices may be separated from each other by one or more fluid connections with the high-pressure outlets of the pressure exchangers.

The wellsite system may comprise a plurality of third flow restricting orifices each fluidly connected between the first manifold and the high-pressure inlet of a corresponding one of the pressure exchangers.

The wellsite system may comprise a plurality of third flow restricting orifices each fluidly connected between the first manifold and the high-pressure outlet of a corresponding one of the pumps.

At least one of the first and second manifolds may be a generally H-shaped geometry. The second flow restricting orifice may be fluidly connected along the second manifold such that the second flow restricting orifice may pass the pressurized dirty fluid discharged by no more than two of the pressure exchangers.

At least one of the first and second manifolds may have a closed loop geometry.

The wellsite system may comprise a third manifold, the pressure exchangers may each have a low-pressure inlet fluidly connected with the third manifold, each pressure exchanger may be operable to receive a low-pressure dirty fluid from the third manifold, and the third manifold may comprise one or more hydraulic damping elements operable to dampen effects of fluid hammer shocks within the third manifold. Each hydraulic damping element may comprise a flexible material defining a gas chamber.

Each pressure exchanger may comprises a low-pressure inlet and a rotor comprising a plurality of fluid chambers extending therethrough. As the rotor rotates, each pressure exchanger may be operable to: receive a low-pressure dirty fluid into one or more of the chambers via the low-pressure inlet of the pressure exchanger; and receive the pressurized clean fluid into the one or more of the chambers via the high-pressure inlet of the pressure exchanger to pressurize and discharge the dirty fluid out of the one or more of the chambers via the high-pressure outlet of the pressure exchanger.

The present disclosure also introduces an apparatus comprising a wellsite system operable to inject a pressurized dirty fluid into a wellbore during a well treatment operation, wherein the wellsite system comprises: a first manifold; a plurality of pumps each having a high-pressure outlet fluidly connected with the first manifold, wherein each of the pumps is operable to inject a pressurized clean fluid into the first manifold; a plurality of second manifolds each fluidly connected with the first manifold; a plurality of third manifolds; a plurality of pressure exchangers each having a high-pressure inlet fluidly connected with a corresponding one of the second manifolds and a high-pressure outlet fluidly connected with a corresponding one of the third manifolds, wherein each of the pressure exchangers is operable to receive the pressurized clean fluid from the corresponding one of the second manifolds and discharge the pressurized dirty fluid into a corresponding one of the third manifolds; a fourth manifold fluidly connected with each of the third manifolds; and a discharge conduit fluidly connected with the fourth manifold and the wellbore.

The wellsite system may comprise a plurality of fluid conduits each fluidly connecting the first manifold with a corresponding one of the second manifolds. The wellsite system may comprise a flow restricting orifice fluidly connected along the first manifold at midpoints between two adjacent ones of the conduits.

The wellsite system may comprise a plurality of flow restricting orifices fluidly connected along the first manifold, and ones of the flow restricting orifices may be separated from each other by one or more fluid connections with the high-pressure outlets of the pumps.

One or more of the first, second, and third manifolds may have a closed loop geometry.

The wellsite system may comprise a fifth manifold, the pressure exchangers may each have a low-pressure inlet fluidly connected with the fifth manifold, each pressure exchanger may be operable to receive a low-pressure dirty fluid from the fifth manifold, and the fifth manifold may comprise one or more hydraulic damping elements operable to dampen effects of fluid hammer shocks within the third manifold. Each hydraulic damping element may comprise a flexible material defining a gas chamber.

Each pressure exchanger may comprise a low-pressure inlet and a rotor comprising a plurality of fluid chambers extending therethrough, As the rotor rotates, each pressure exchanger may be operable to: receive a low-pressure dirty fluid into one or more of the chambers via the low-pressure inlet of the pressure exchanger; and receive the pressurized clean fluid into the one or more of the chambers via the high-pressure inlet of the pressure exchanger to pressurize and discharge the dirty fluid out of the one or more of the chambers via the high-pressure outlet of the pressure exchanger.

The present disclosure also introduces a method comprising: operating each of a plurality of pumps to receive and pressurize a clean fluid; directing the pressurized clean fluid from each of the pumps into a first manifold to distribute the pressurized clean fluid among a plurality of pressure exchangers, wherein the pressurized clean fluid received into the first manifold is passed through a first flow restricting orifice fluidly connected along the first manifold to reduce pressure oscillations in the clean fluid within the first manifold; operating each of the pressure exchangers by receiving a dirty fluid and receiving the pressurized clean fluid to pressurize and discharge the dirty fluid; directing the pressurized dirty from each of the pressure exchangers into a second manifold to combine the dirty fluid discharged by each of the pressure exchangers, wherein the pressurized dirty fluid received into the second manifold is passed through a second flow restricting orifice fluidly connected along the second manifold to reduce pressure oscillations in the dirty fluid within the second manifold; and directing the pressurized dirty fluid out of the second manifold for injection into a wellbore during a well treatment operation.

The method may comprise passing the pressurized clean fluid through a third flow restricting orifice fluidly connected along the first manifold to further reduce the pressure oscillations in the clean fluid within the first manifold.

The method may comprise passing the pressurized dirty fluid through a third flow restricting orifice fluidly connected along the second manifold to further reduce the pressure oscillations in the dirty fluid within the second manifold.

Directing the pressurized clean fluid from each of the pumps into the first manifold may comprise passing the pressurized clean fluid from each of the pumps into the first manifold through a corresponding third flow restricting orifice to further reduce the pressure oscillations generated by each of the pumps.

Directing the pressurized dirty fluid from each of the pressure exchangers into the second manifold may comprise passing the pressurized dirty fluid from each of the pressure exchangers into the second manifold through a corresponding third flow restricting orifice to further reduce the pressure oscillations generated by each of the pressure exchangers.

At least one of the first and second manifolds may have a generally H-shaped geometry.

At least one of the first and second manifolds may have a closed loop geometry.

Each pressure exchanger may comprise a rotor having a plurality of fluid chambers extending therethrough. Operating each of the pressure exchangers may comprise, as the rotor rotates: receiving the dirty fluid into one or more of the chambers; and receiving the pressurized clean fluid into the one or more of the chambers to pressurize and discharge the dirty fluid out of the one or more of the chambers.

The foregoing outlines features of several implementations so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions, and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
a wellsite system operable to inject a pressurized dirty fluid into a wellbore during a well treatment operation, wherein the wellsite system comprises:
a first manifold;
a plurality of pumps each having a high-pressure outlet fluidly connected with the first manifold, wherein each of the pumps is operable to inject a pressurized clean fluid into the first manifold;
a second manifold;
a plurality of pressure exchangers each having a high-pressure inlet fluidly connected with the first manifold and a high-pressure outlet fluidly connected with the second manifold, wherein each of the pressure exchangers is operable to receive the pressurized clean fluid from the first manifold and discharge the pressurized dirty fluid into the second manifold;
a damping system having a plurality of flow restricting orifices including:

a first flow restricting orifice fluidly connected on an upstream side of the first manifold to dampen pressure oscillations of the pressurized clean fluid being injected into the first manifold;

a second flow restricting orifice fluidly connected along the second manifold to dampen pressure oscillations present within the pressurized dirty fluid prior to injection of the pressurized dirty fluid into the wellbore; and a discharge conduit fluidly connected between the second manifold and the wellbore.

2. The apparatus of claim 1 wherein the wellsite system further comprises a third flow restricting orifice fluidly connected along the first manifold, and wherein the first and third flow restricting orifices are separated from each other by one or more fluid connections with the high-pressure outlets of the pumps.

3. The apparatus of claim 1 wherein the wellsite system further comprises a third flow restricting orifice fluidly connected along the second manifold, and wherein the first and third flow restricting orifices are separated from each other by one or more fluid connections with the high-pressure outlets of the pressure exchangers.

4. The apparatus of claim 1 wherein the wellsite system further comprises a plurality of third flow restricting orifices each fluidly connected between the first manifold and the high-pressure inlet of a corresponding one of the pressure exchangers.

5. The apparatus of claim 1 wherein the wellsite system further comprises a plurality of third flow restricting orifices each fluidly connected between the first manifold and the high-pressure outlet of a corresponding one of the pumps.

6. The apparatus of claim 1 wherein at least one of the first and second manifolds has a generally H-shaped geometry.

7. The apparatus of claim 6 wherein the second flow restricting orifice is fluidly connected along the second manifold such that the second flow restricting orifice passes the pressurized dirty fluid discharged by no more than two of the pressure exchangers.

8. The apparatus of claim 1 wherein at least one of the first and second manifolds has a closed loop geometry.

9. The apparatus of claim 1 wherein the wellsite system further comprises a third manifold, wherein the pressure exchangers each have a low-pressure inlet fluidly connected with the third manifold, wherein each of the pressure exchangers is operable to receive a low-pressure dirty fluid from the third manifold, and wherein the third manifold comprises one or more hydraulic damping elements operable to dampen effects of fluid hammer shocks within the third manifold.

10. The apparatus of claim 9 wherein each hydraulic damping element comprises a flexible material defining a gas chamber.

11. The apparatus of claim 1 wherein each of the pressure exchangers further comprises:
a low-pressure inlet; and
a rotor comprising a plurality of fluid chambers extending therethrough, wherein as the rotor rotates, each pressure exchanger is operable to:
receive a low-pressure dirty fluid into one or more of the chambers via the low-pressure inlet of the pressure exchanger; and
receive the pressurized clean fluid into the one or more chambers via the high-pressure inlet of the pressure exchanger to pressurize and discharge the dirty fluid out of the one or more of the chambers via the high-pressure outlet of the pressure exchanger.

12. An apparatus comprising:
a wellsite system operable to inject a pressurized dirty fluid into a wellbore during a well treatment operation, wherein the wellsite system comprises:
a first manifold;
a plurality of pumps each having a high-pressure outlet fluidly connected with the first manifold, wherein each of the pumps is operable to inject a pressurized clean fluid into the first manifold;
a plurality of second manifolds each fluidly connected with the first manifold;
a plurality of third manifolds;
a plurality of pressure exchangers each having a high-pressure inlet fluidly connected with a corresponding one of the second manifolds and a high-pressure outlet fluidly connected with a corresponding one of the third manifolds, wherein each of the pressure exchangers is operable to receive the pressurized clean fluid from the corresponding one of the second manifolds and discharge the pressurized dirty fluid into a corresponding one of the third manifolds;
a fourth manifold fluidly connected with each of the third manifolds;
a discharge conduit fluidly connected with the fourth manifold and the wellbore; and
a damping system through which the pressurized clean fluid is flowed, the damping system being located along the flow path between the plurality of pumps and the first manifold so as to to dampen pressure oscillations within the clean fluid prior to being discharged from the first manifold.

13. The apparatus of claim 12 wherein the wellsite system further comprises a plurality of fluid conduits each fluidly connecting the first manifold with a corresponding one of the second manifolds.

14. The apparatus of claim 13 wherein the wellsite system further comprises a flow restricting orifice fluidly connected along the first manifold at midpoints between two adjacent ones of the conduits.

15. The apparatus of claim 12 wherein the wellsite system further comprises a plurality of flow restricting orifices fluidly connected along the first manifold, and wherein ones of the flow restricting orifices are separated from each other by one or more fluid connections with the high-pressure outlets of the pumps.

16. The apparatus of claim 12 wherein one or more of the first, second, and third manifolds has a closed loop geometry.

17. The apparatus of claim 12 wherein the wellsite system further comprises a fifth manifold, wherein the pressure exchangers each have a low-pressure inlet fluidly connected with the fifth manifold, wherein each of the pressure exchangers is operable to receive a low-pressure dirty fluid from the fifth manifold, and wherein the fifth manifold comprises one or more hydraulic damping elements operable to dampen effects of fluid hammer shocks within the third manifold.

18. The apparatus of claim 17 wherein each hydraulic damping element comprises a flexible material defining a gas chamber.

19. The apparatus of claim 12 wherein each of the pressure exchangers further comprises:
a low-pressure inlet; and
a rotor comprising a plurality of fluid chambers extending therethrough, wherein as the rotor rotates, each pressure exchanger is operable to:

receive a low-pressure dirty fluid into one or more of the chambers via the low-pressure inlet of the pressure exchanger; and receive the pressurized clean fluid into the one or more of the chambers via the high-pressure inlet of the pressure exchanger to pressurize and discharge the dirty fluid out of the one or more of the chambers via the high-pressure outlet of the pressure exchanger.

20. A method comprising:

operating each of a plurality of pumps to receive and pressurize a clean fluid;

directing the pressurized clean fluid from each of the pumps into a first manifold to distribute the pressurized clean fluid among a plurality of pressure exchangers, wherein the pressurized clean fluid received into the first manifold is passed through a first flow restricting orifice fluidly connected between the first manifold and the plurality of pumps at a location able to reduce pressure oscillations in the clean fluid before the clean fluid flows through the first manifold so as to reduce the effects of pressure oscillations on the first manifold;

operating each of the pressure exchangers by:
  receiving a dirty fluid; and
  receiving the pressurized clean fluid to pressurize and discharge the dirty fluid;

directing the pressurized dirty fluid from each of the pressure exchangers into a second manifold to combine the dirty fluid discharged by each of the pressure exchangers, wherein the pressurized dirty fluid received into the second manifold is passed through a second flow restricting orifice fluidly connected between the second manifold and the plurality of pressure exchangers at a location able to reduce pressure oscillations in the dirty fluid within the second manifold; and directing the pressurized dirty fluid out of the second manifold for injection into a wellbore during a well treatment operation.

21. The method of claim 20 further comprising passing the pressurized clean fluid through a third flow restricting orifice fluidly connected along the first manifold to further reduce the pressure oscillations in the clean fluid within the first manifold.

22. The method of claim 20 further comprising passing the pressurized dirty fluid through a third flow restricting orifice fluidly connected along the second manifold to further reduce the pressure oscillations in the dirty fluid within the second manifold.

23. The method of claim 20 wherein directing the pressurized clean fluid from each of the pumps into the first manifold comprises passing the pressurized clean fluid from each of the pumps into the first manifold through a corresponding third flow restricting orifice to further reduce the pressure oscillations generated by each of the pumps.

24. The method of claim 20 wherein directing the pressurized dirty fluid from each of the pressure exchangers into the second manifold comprises passing the pressurized dirty fluid from each of the pressure exchangers into the second manifold through a corresponding third flow restricting orifice to further reduce the pressure oscillations generated by each of the pressure exchangers.

25. The method of claim 20 wherein at least one of the first and second manifolds has a generally H-shaped geometry.

26. The method of claim 20 wherein at least one of the first and second manifolds has a closed loop geometry.

27. The method of claim 20 wherein each of the pressure exchangers comprises a rotor having a plurality of fluid chambers extending therethrough, and wherein operating each of the pressure exchangers further comprises, as the rotor rotates:

receiving the dirty fluid into one or more of the chambers; and receiving the pressurized clean fluid into the one or more of the chambers to pressurize and discharge the dirty fluid out of the one or more of the chambers.

* * * * *